United States Patent
Olson et al.

(10) Patent No.: US 9,892,357 B2
(45) Date of Patent: Feb. 13, 2018

(54) METHOD FOR REMOTELY CONTROLLING A REPROGRAMMABLE PAYMENT CARD

(71) Applicant: CardLab ApS., Herlev (DK)

(72) Inventors: Thiago Olson, Ann Arbor, MI (US); Christopher Bartenstein, Ann Arbor, MI (US); Henry Balanon, Ann Arbor, MI (US)

(73) Assignee: CardLab, ApS., Herlev (DK)

( * ) Notice: Subject to any disclaimer, the term of this patent is extended or adjusted under 35 U.S.C. 154(b) by 610 days.

(21) Appl. No.: 14/542,092

(22) Filed: Nov. 14, 2014

(65) Prior Publication Data

US 2015/0134513 A1    May 14, 2015

Related U.S. Application Data

(60) Provisional application No. 62/003,430, filed on May 27, 2014, provisional application No. 61/962,709, filed on Nov. 14, 2013.

(51) Int. Cl.
*G06Q 40/00*   (2012.01)
*G06K 19/06*   (2006.01)
(Continued)

(52) U.S. Cl.
CPC ... *G06K 19/06206* (2013.01); *G06Q 20/3278* (2013.01); *G06Q 20/352* (2013.01); *G07F 7/0893* (2013.01)

(58) Field of Classification Search
CPC ........ G06Q 10/00; G06Q 20/00; G06Q 30/00; G06Q 40/00
(Continued)

(56) References Cited

U.S. PATENT DOCUMENTS 6,282,522 B1 * 8/2001 Davis .................... G06Q 20/02
235/375
6,592,044 B1    7/2003 Wong et al.
(Continued)

FOREIGN PATENT DOCUMENTS

WO      0154109 A    7/2001
WO   2009082760 A    7/2009

OTHER PUBLICATIONS

BWOne. Credit Card 2.0 Powered Cards by Dynamics, Inc. at CES Unveiled NYC 2010—BWOne.com. Nov. 2010. [retrieved on Oct. 11, 2013] Retrieved from the internet: <http://www.youtube.com/watch?v=IVuUCbkYNxA>.

*Primary Examiner* — Frantzy Poinvil
(74) *Attorney, Agent, or Firm* — Run8 Patent Group, LLC; Peter Miller

(57) ABSTRACT

One variation of a method for remotely controlling a payment card in real-time through a computing device includes: at the computing device, establishing a wireless connection with a payment card; over the wireless connection, receiving a first identifier of a first magnetic stripe card corresponding to a first magnetic stripe sequence command stored on the payment card; in response to receiving the first identifier of the first magnetic stripe card, rendering a first notification on a display of the computing device, the first notification indicating the first magnetic stripe card; and in response to receiving a selection for the first notification rendered on the display of the computing device, transmitting an instruction to the payment card, over the wireless connection, to emulate the first magnetic stripe card according to the first magnetic stripe sequence command during an upcoming transaction.

20 Claims, 7 Drawing Sheets

(51) Int. Cl.
*G06Q 20/32* (2012.01)
*G06Q 20/34* (2012.01)
*G07F 7/08* (2006.01)

(58) Field of Classification Search
USPC .................................................. 705/3–44
See application file for complete search history.

(56) References Cited

U.S. PATENT DOCUMENTS

| | | | |
|---|---|---|---|
| 6,595,342 B1 | 7/2003 | Matzen et al. | |
| 6,925,439 B1 | 8/2005 | Pitroda | |
| 7,097,108 B2 | 8/2006 | Zellner et al. | |
| 7,127,236 B2 | 10/2006 | Khan et al. | |
| 7,246,752 B2 | 7/2007 | Brown | |
| 7,380,710 B2 | 6/2008 | Brown | |
| 7,472,829 B2 | 1/2009 | Brown | |
| 7,543,739 B2 | 6/2009 | Brown et al. | |
| 7,552,869 B1 | 6/2009 | Ramachandran | |
| 7,578,437 B2 | 8/2009 | Lu et al. | |
| 7,580,898 B2 | 8/2009 | Brown et al. | |
| 7,584,153 B2 | 9/2009 | Brown et al. | |
| 7,621,458 B2 | 11/2009 | Zellner et al. | |
| 7,631,804 B2 | 12/2009 | Brown | |
| 7,641,124 B2 | 1/2010 | Brown et al. | |
| 7,690,580 B2 | 4/2010 | Shoemaker | |
| 7,784,687 B2 | 8/2010 | Mullen et al. | |
| 7,793,851 B2 | 9/2010 | Mullen | |
| 7,815,114 B2 | 10/2010 | Mesaros | |
| 7,823,794 B2 | 11/2010 | Li et al. | |
| 7,828,220 B2 | 11/2010 | Mullen | |
| 7,931,195 B2 | 4/2011 | Mullen | |
| 7,954,705 B2 | 6/2011 | Mullen | |
| 7,954,708 B2 | 6/2011 | Blossom | |
| 7,954,724 B2 | 6/2011 | Poidomani et al. | |
| 8,011,577 B2 | 9/2011 | Mullen et al. | |
| 8,015,592 B2 | 9/2011 | Doughty et al. | |
| 8,020,775 B2 | 9/2011 | Mullen et al. | |
| 8,066,191 B1 | 11/2011 | Cloutier et al. | |
| 8,074,877 B2 | 12/2011 | Mullen et al. | |
| 8,104,679 B2 | 1/2012 | Brown | |
| 8,172,148 B1 | 5/2012 | Cloutier et al. | |
| 8,201,747 B2 | 6/2012 | Brown et al. | |
| 8,231,063 B2 | 7/2012 | Poidomani et al. | |
| 8,267,327 B2 | 9/2012 | Tsao et al. | |
| 8,282,007 B1 | 10/2012 | Cloutier et al. | |
| 8,286,876 B2 | 10/2012 | Mullen et al. | |
| 8,302,872 B2 | 11/2012 | Mullen | |
| 8,313,037 B1 | 11/2012 | Humphrey | |
| 8,660,948 B2 | 2/2014 | Dessert et al. | |
| 8,923,827 B2 * | 12/2014 | Wentker | G06Q 20/10 455/406 |
| 9,053,398 B1 | 6/2015 | Cloutier | |
| 2002/0120583 A1 | 8/2002 | Keresman et al. | |
| 2003/0145205 A1 * | 7/2003 | Sarcanin | G06Q 20/02 713/172 |
| 2004/0035942 A1 | 2/2004 | Silverman | |
| 2008/0058014 A1 | 3/2008 | Khan et al. | |
| 2009/0159688 A1 | 6/2009 | Mullen et al. | |
| 2009/0159690 A1 | 6/2009 | Mullen et al. | |
| 2009/0159698 A1 | 6/2009 | Mullen et al. | |
| 2011/0167375 A1 | 7/2011 | Kocienda | |
| 2011/0218911 A1 | 9/2011 | Spodak | |
| 2011/0284632 A1 | 11/2011 | Mullen et al. | |
| 2012/0005076 A1 | 1/2012 | Dessert et al. | |
| 2012/0052800 A1 | 3/2012 | Bona et al. | |
| 2012/0074232 A1 | 3/2012 | Spodak et al. | |
| 2013/0103537 A1 | 4/2013 | Hewett | |
| 2013/0124319 A1 | 5/2013 | Hodge et al. | |
| 2013/0146661 A1 | 6/2013 | Melbrod et al. | |
| 2013/0187753 A1 | 7/2013 | Chiriyankandath | |
| 2013/0228616 A1 | 9/2013 | Bhosle et al. | |
| 2013/0254110 A1 * | 9/2013 | Royyuru | G06Q 20/38 705/44 |
| 2014/0195416 A1 * | 7/2014 | Linscott | G06Q 20/102 705/39 |
| 2015/0235195 A1 * | 8/2015 | Lee | G06Q 20/204 705/17 |
| 2015/0339659 A1 * | 11/2015 | Ballesteros | G06Q 20/3229 705/76 |

* cited by examiner

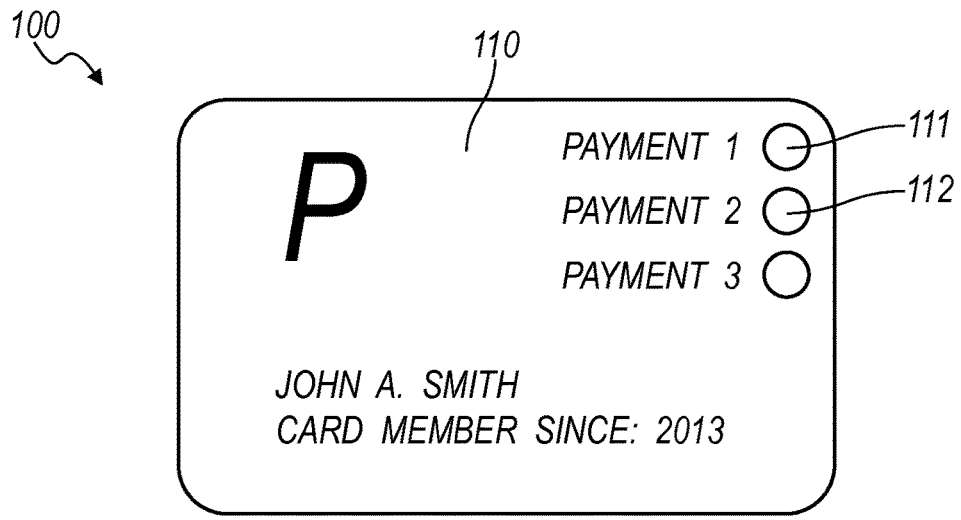
FIG. 2A
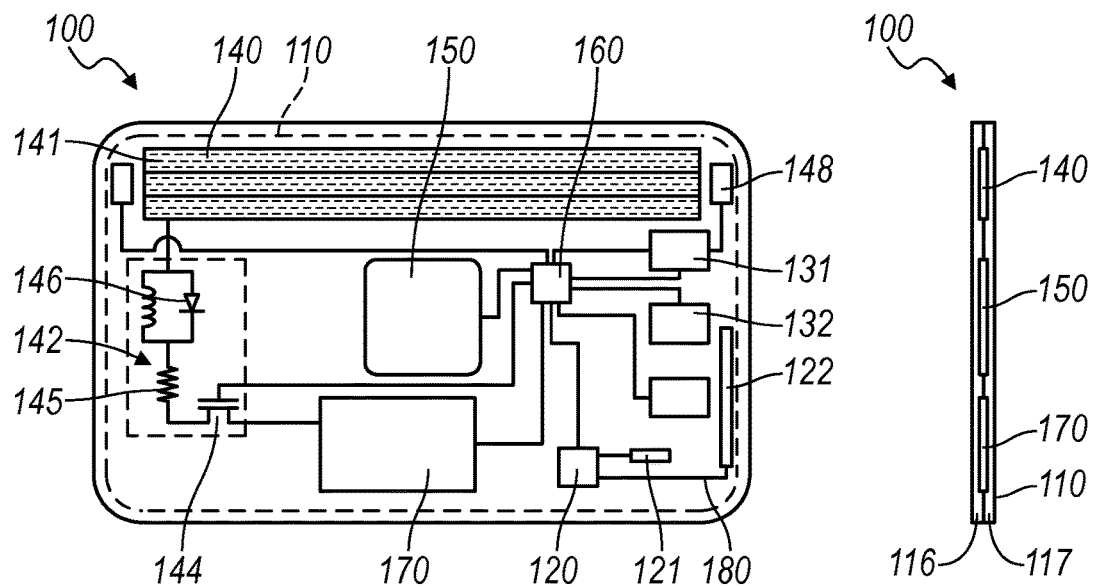
FIG. 2B
FIG. 2C

METHOD FOR REMOTELY CONTROLLING A REPROGRAMMABLE PAYMENT CARD

CROSS-REFERENCE TO RELATED APPLICATIONS

This application claims the benefit of U.S. Provisional Patent Application No. 61/962,709 filed on 14 Nov. 2013, and U.S. Provisional Patent Application No. 62/003,430, filed on 27 May 2014, both of which are incorporated in their entireties by this reference.

Furthermore, this application is related to U.S. patent application Ser. No. 13/904,939, filed on 29 May 2013, which is incorporated in its entirety by this reference.

TECHNICAL FIELD

This invention relates generally to the field of bank cards and, more specifically, to a new and useful method for facilitating payment with a programmable payment card in the field of bank cards.

BRIEF DESCRIPTION OF THE FIGURES

FIGS. 2A, 2B, and 2C are schematic representations of a payment card in accordance with the first method and a second method.

DESCRIPTION OF THE EMBODIMENTS

The following description of the embodiments of the invention is not intended to limit the invention to these embodiments, but rather to enable any person skilled in the art to make and use this invention.

1. First Method: Payment Card

Figure 1:
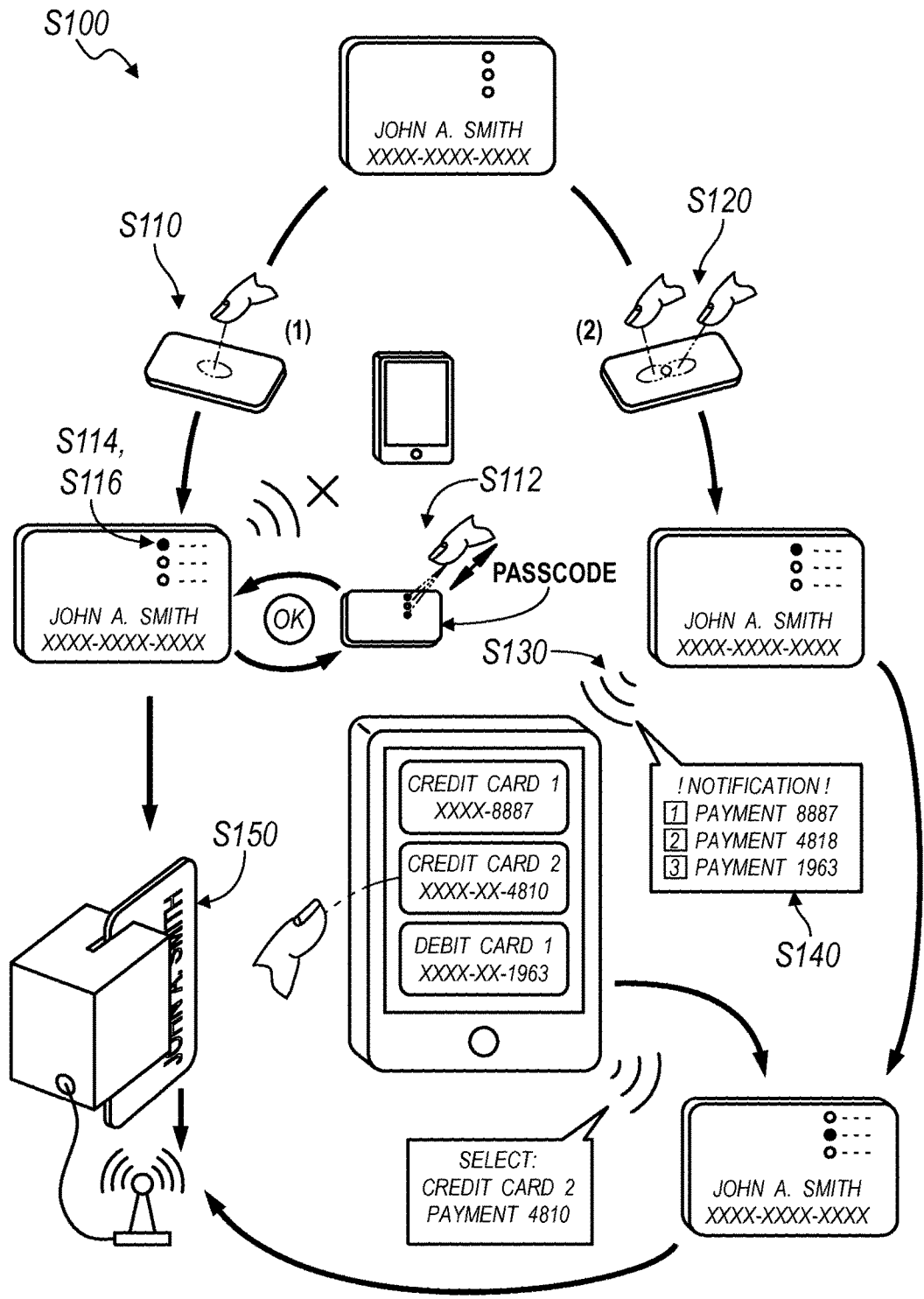
FIG. 1 is a flowchart representation of a first method.

As shown in FIG. 1, a first method S100 for facilitating payment with a payment card includes: in response to receiving a first input sequence on a surface of the payment card, entering a first mode at the payment card in Block S110; in response to receiving a second input sequence on the surface of the payment card, entering a second mode at the payment card in Block S120; in the second mode, attempting to establish a wireless connection with a computing device associated with the payment card in Block S130; in response to establishing the wireless connection with the computing device, transmitting to the computing device a trigger for a notification and an identifier of a magnetic stripe card corresponding to a magnetic stripe sequence command stored on the payment card in Block S140; and, in response to detecting a magnetic read head adjacent the payment card, driving a magnetic stripe emulator within the payment card according to a magnetic stripe sequence command stored on the payment card and corresponding to a magnetic stripe card in Block S150.!!

Generally, the first method S100 can be implemented on a reprogrammable payment card—such as described in U.S. patent application Ser. No. 13/904,939—to facilitate payment with the payment card by automatically sharing payment-related information and enabling payment card controls through an associated mobile computing device, such as through a smartphone or a tablet wirelessly paired, linked, or otherwise affiliated with the payment card. For example, a reprogrammable payment card can store magnetic stripe commands corresponding to (static) magnetic stripe cards, can execute a particular magnetic stripe command to emulate the corresponding magnetic stripe card at a card reader, and can execute the first method S100 to automatically share transaction-related data with an associated mobile computing device before, during, or after a transaction with the payment card, thereby reducing or eliminating a number of inputs that a user must otherwise enter into the mobile computing device to access the transaction-related information or other payment card controls on the mobile computing device. By thus communicating directly with the mobile computing device according to the first method S100, the payment card can cooperate with the mobile computing device to make payment card information and/or payment card controls immediately and automatically available to the user through the mobile computing device.

Therefore, as in the foregoing example applications, a payment card can implement the first method S100 to automatically transmit a notification to a particular mobile computing device associated with the payment card such that data immediately relevant to use of the payment card in a recent transaction (e.g., the first example application described below) or in an upcoming transaction (e.g., the second example application described below) may be displayed on the mobile computing device without (substantial) additional user input into either the mobile computing device or the payment card. For example, the payment card can implement the first method S100 to automatically transmit identifiers for payment methods loaded into each "payment slot" on the payment card to the mobile computing device, and the mobile computing device can present these identifiers to the user in the form of one or more notifications on a locked screen or a home screen of the mobile computing device. Similarly, the payment card can implement the first method S100 to automatically transmit a notification to the mobile computing device when the payment card is turned on (or after some other event at the payment card) to automatically provide immediate access to additional payment card controls at the mobile computing device and without additional user input at the mobile computing device to access such payment card controls. For example, the payment card can implement the first method S100 to automatically transmit identifiers for payment methods loaded into its payment slots to the mobile computing device, and the mobile computing device can present these identifiers to the user in the form of one or more notifications that the user can select to elect a particular payment method for an upcoming transaction or through which the user can select other payment methods to load onto the card, such as directly from a lock screen or home screen of the mobile computing device rather than from within a native payment card application that the user must manually open on the mobile computing device.

Furthermore, the first method S100 is executable by a reprogrammable payment card or any other suitable device (e.g., wearable device, hard case for mobile computing device, etc.) containing a component and/or circuitry configured to emulate an external payment method (e.g., credit card), identification method (e.g., employee badge), and/or access method (e.g., door access card). The first method S100 is described below as a method executable by a payment card configured to emulate a magnetic stripe card—such as a magnetic stripe credit card, a magnetic stripe debit card, magnetic stripe gift card, and/or a magnetic stripe door access card. However, the first method S100 can be similarly be executed by a payment card or other device configured to emulate other types of transactional systems, such as integrated circuit cards (or "chip" cards, "smart" cards), bar code cards, Wiegand wire embedded cards, RFID proximity cards, and/or tokenized (e.g., dynamic) payment credentials, etc. for payment methods, access methods, and/or identification methods in addition to or in place of emulation of static magnetic stripe cards. However, the first method S100 can be implemented in conjunction with any other suitable type of payment card or other device configured to emulate any other suitable type of payment method, access method, or identification method.

1.1 Example Applications

Figure 3:
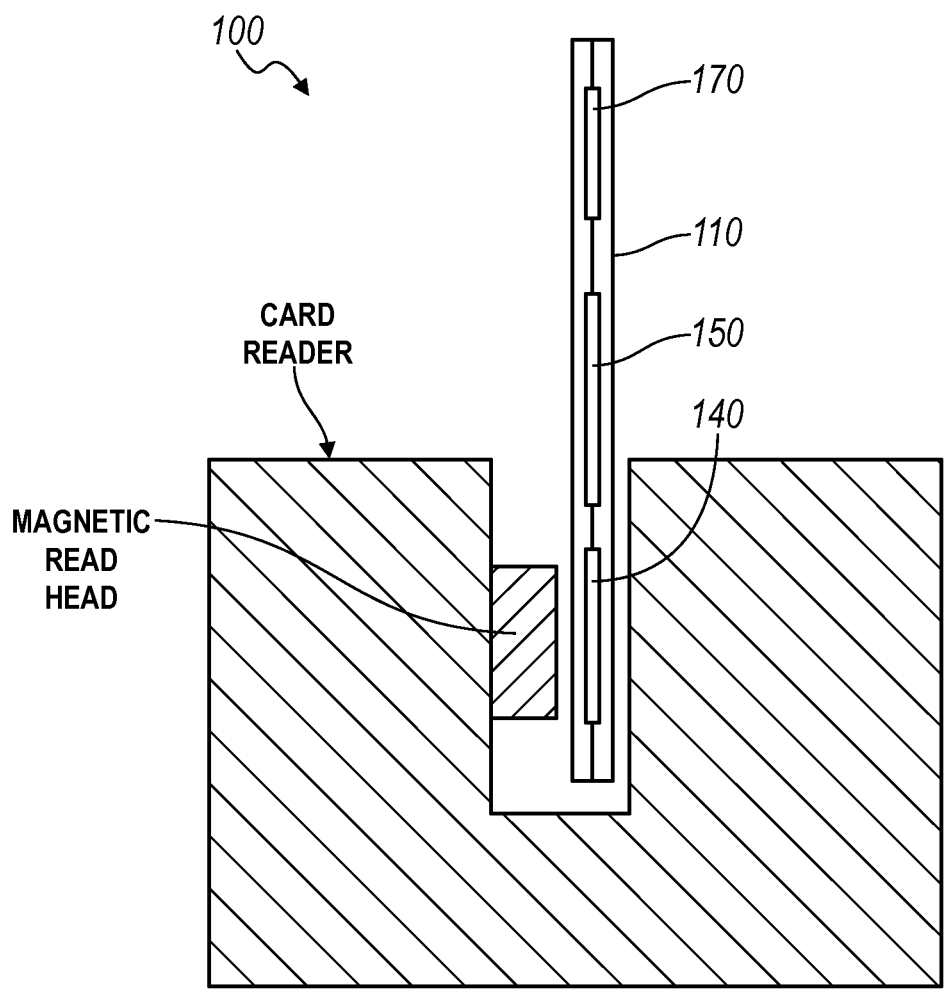
FIG. 3 is a graphical representation in accordance with the first method and the second method.
Figure 5:
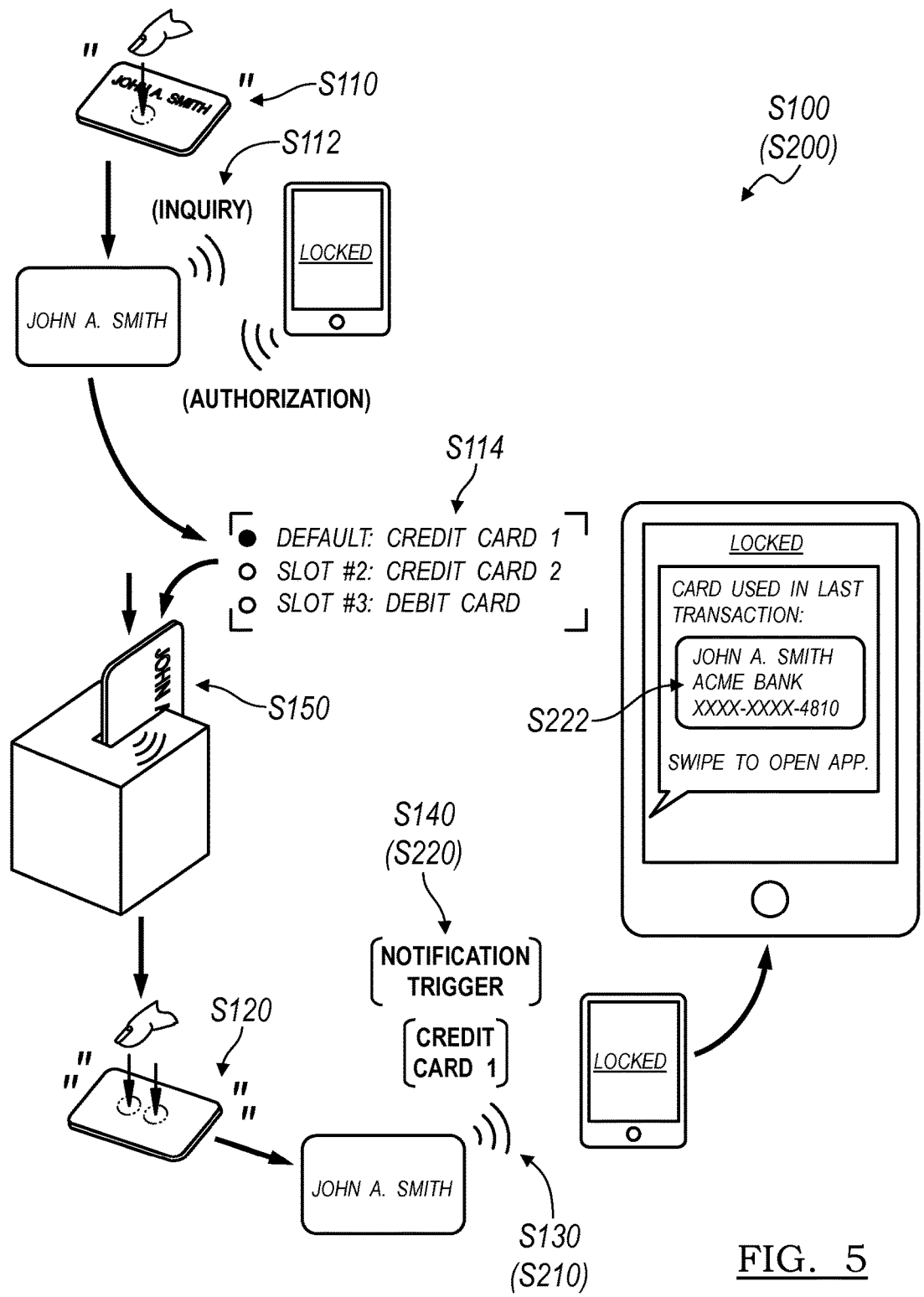
FIG. 5 is a flowchart representation in accordance with variations of the first method and the second method.

As shown in FIG. 5, in a first example application, a user provides the payment card to a sales clerk to make a purchase at a retail outlet. In this example application, the payment card enters the first mode in Block S110 in response to a single tap input—entered by the user onto a surface of the payment card—that wakes the payment from an off or sleep state. The payment card then authorizes use of the payment in an upcoming transaction, such as by establishing a wireless connection with the user's mobile computing device or by authenticating a passcode entered by the user directly onto a surface of the payment card, such as described in U.S. patent application Ser. No. 13/904,939. With use of the payment card thus authorized, the payment card elects a default payment method (e.g., a credit card, a debit card) stored in memory on the payment card—such as a preset default payment method or a payment method emulated in a previous transaction—for the upcoming transaction. The payment card can additionally or alternatively receive a selection—entered manually into the payment card—for a particular payment method stored in memory on the payment card. A processor or other controller within the payment card can then poll a magnetic read head sensor within the payment card to detect a magnetic read head (or other card reader) adjacent the payment card, such as when the card is brought in contact with and/or slid through a read slot of a magnetic card reader, as shown in FIG. 3. Once an output of the magnetic read head sensor indicates that a card reader is near the payment card, a magnetic stripe emulator within the payment card can output a varying magnetic field according to a magnetic stripe output corresponding to the default or user-elected payment method to emulate the payment method as the payment card is swept through the card reader by the sales clerk. The sales clerk then requests that the user provide the last four digits of a card number of the payment method used in the transaction, and the user double-taps the surface of the payment card. The payment card then enters the second mode in Block S120 in response to receipt of the double-tap input and pushes an identifier of the payment method used in the transaction and a trigger to display a corresponding notification to the user's mobile computing device. The mobile computing device then executes the second method described below, such as through a native payment card application, to render on its display a notification containing the last four digits of the card number of the payment method used in the transaction. The mobile computing device can render the notification within a locked screen or on a home screen of the mobile computing device. The user then shares (e.g., shows) his mobile computing device with the sales clerk to complete the transaction. Thus, as in this first example application, the user can supply a minimal number of inputs directly into the payment card to retrieve relevant transaction-related data through his mobile computing device rather than interface with the mobile computing device to unlock the mobile computing device, select a related native payment card application, and request transaction-related information through the native payment card application.

Figure 6:
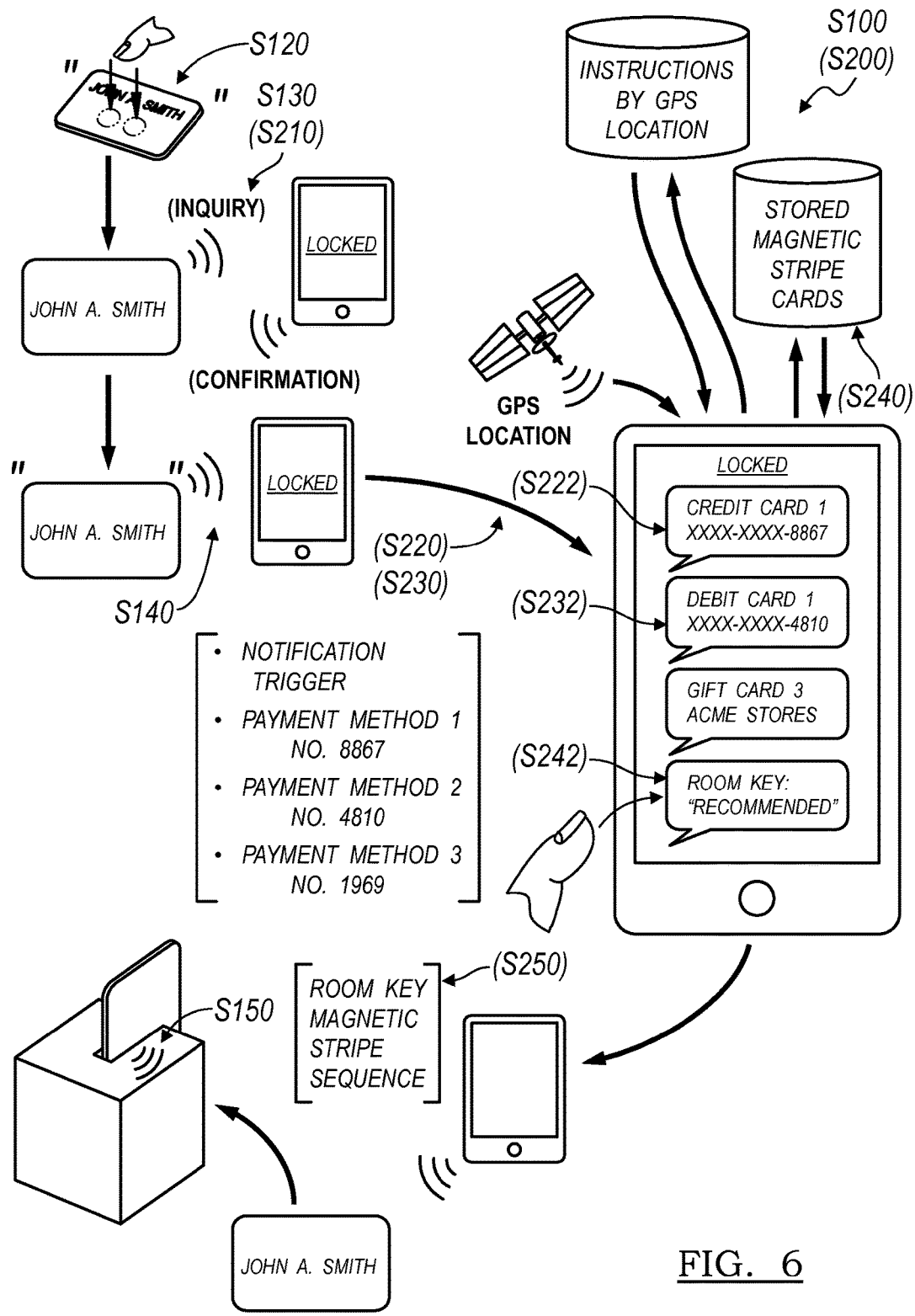
FIG. 6 is a flowchart representation in accordance with variations of the first method and the second method.

As shown in FIG. 6, in a second example application, the payment card executes Blocks of the first method S100 prior to a transaction with the payment card. In this second example application, the payment card enters the first mode in Block S110 in response to receipt of a single input on a surface of the payment card. In first mode, the payment card operates as a standalone system for emulating magnetic stripe cards (e.g., credit cards, debit cards, gift cards, door access cards, personal identification cards, rewards cards, etc.) corresponding to magnetic stripe sequence commands stored on the payment card. For example, in the first mode, the payment card can elect a default payment method (e.g., a credit card, a debit card), such as a preset default payment method or a payment method selected for a previous transaction, for the upcoming transaction. The payment card can additionally or alternatively receive a selection—entered manually into the payment card—for a particular payment method stored in memory on the payment card, such as a payment method assigned to a second payment slot or a third payment slot on the payment card, as described in U.S. patent application Ser. No. 13/904,939. Once the payment card authenticates its use in an upcoming transaction, such as based on a passcode entered into the payment card by the user or based on wireless communications with the user's smartphone, the user can swipe (or hand to a sales clerk to swipe) the payment card through a card reader in a subsequent transaction. However, in this second example application, the payment card can enter into the second mode in Block S120 in response to receipt of two tap inputs on the surface of the payment card within a threshold period of time, such as two impacts on the payment card that deflect that payment card by a threshold degree within a two-second time interval. Once in the second mode, the payment card can establish a wireless connection with the user's mobile computing device (e.g., smartphone) in Block S130 and then push a trigger for a notification related to the payment card to the mobile computing device in Block S140. For example, payment card can transmit to the mobile computing device an identifier (e.g., a unique key, a nickname, a card number) of each payment method assigned to a payment slot on payment card. The mobile computing device can then execute the second method described below, such as through a native payment card application, to deliver one notification specifying a corresponding payment method per each identifier received from the payment card substantially immediately following receipt of the trigger from the payment card. The mobile computing device can also identify alternative payment methods suitable for an upcoming transaction in response to receipt of the trigger from the payment card, such as based on a Global Positioning System (GPS) location of the mobile computing device at or around the time of receipt of the trigger from the payment card, and the mobile computing device can render—on its display and with the foregoing notification(s)—an additional notification corresponding to each identified alternative payment method. The user can then review the notification to identify which payment methods are (and are not) loaded onto the payment card and assigned to particular payment slots on the card; the user can then implement this information to enter a selection for a particular payment slot at the payment card. Alternatively, the user can select a particular notification at the mobile computing device (e.g., by swiping a particular notification rendered on a touchscreen of the mobile computing device), and the mobile computing device can execute the second method to push an instruction to the payment card, over the wireless connection, to emulate a particular payment method (or other magnetic stripe card) corresponding to the particular notification selected by the user at the mobile computing device. Furthermore, if the particular payment method corresponds to a particular magnetic stripe sequence command not currently installed on the payment card (or not currently assigned to a payment slot of the payment card), the mobile computing device can further upload the particular magnetic stripe sequence command to the payment card in preparation for the upcoming transaction. Therefore, in this second example application, the payment card executes the first method S100 by operating in the first mode to enable control of the payment card locally at the payment card and by operating in the second mode to enable additional controls through a mobile computing device affiliated within the payment, such as a smartphone or tablet executing the second method described below.

However, the payment card can execute the first method S100 in any other suitable application. The payment card can also execute methods and techniques of both the first example application and the second example application described above at different times during the same transaction performed with the payment card.

1.2 Payment Card

As described in U.S. patent application Ser. No. 13/904,939 and shown in FIGS. 2A, 2B, and 2C, a payment card 100 can include: a sheet 110 including a first icon in and a second icon 112; a transducer 150 arranged within the sheet 110 and configured to output a voltage in response to an impulse on a surface of the sheet 110; a wireless communication module 120; a first input region 131 adjacent the first icon 111; a second input region 132 adjacent the second icon 112; a magnetic stripe emulator 140; and a processor 160 arranged within the sheet 110 and configured to transition from a passive state to an active state in response to receiving a voltage output from the transducer 150, to receive a first magnetic stripe sequence command associated with a first payment method and a second magnetic stripe sequence command associated with a second payment method through the wireless communication module 120, to assign the first payment method to the first input region 131 and the second payment method to the second input region 132, to receive a selection for the second payment method from the second input region 132 in response to an input adjacent the second icon 112, and to control the magnetic stripe emulator 140 according to the second magnetic stripe sequence command in response to receiving the selection for the second payment method.

Generally, the payment card functions to consolidate multiple (plastic) payment cards (e.g., one or more debit cards, credit cards, gift cards) into a single physical card that can imitate payment functionalities of the multiple plastic payment cards through manipulation of a magnetic stripe emulator. For example, the payment card can imitate a user's debit card issued through a bank, a user's primary credit card issued by a preferred credit card company, and a user's secondary credit card issued by another credit card company by selectively driving the magnetic stripe emulator according to a unique magnetic stripe sequence command associated with each individual card. The payment card can additionally or alternatively imitate a gift card, an identification (i.e., ID) card (e.g., a driver's license), a loyalty card, a door or gate access card, or any other magnetic stripe card containing data in a static magnetic stripe. The payment card can also define a form factor substantially similar to that of a standard plastic payment card, such as a sheet 3.370" (850.60 mm) wide, 2.125" (53.98 mm) tall, and 0.06" thick.

The payment card can thus include multiple "payment slots," each containing or pointing to data (e.g., a magnetic stripe sequence command) pertaining to a corresponding payment method loaded onto the payment card. For example, a first payment slot on the card can hold or point to credit card data, a second payment slot on the card can hold or point to debit card data, and a third payment slot on the card can hold or point to gift card data; a user can thus select one of the first, second, and third slots to enable the corresponding payment method for an upcoming transaction. Subsequently, the payment card can drive the magnetic strip emulator arranged within the payment card according to a magnetic stripe sequence corresponding to the payment method assigned to the selected payment slot when the card is swept passed a card reader (e.g., a magnetic read head), thereby communication relevant information into the card reader. The payment card can also interface with a mobile computing device to upload new magnetic stripe sequence commands to payment slots on the card, to delete payment method data from the card, etc.

1.3 Inputs

Block S110 of the first method S100 recites, in response to receiving a first input sequence on a surface of the payment card, entering a first mode at the payment card; and Blocks 120 of the first method S100 recites, in response to receiving a second input sequence on the surface of the payment card, entering a second mode at the payment card in Block S120. Generally, Blocks S110 and S120 function to transition the payment card—such as from a sleep, "OFF," or hibernate state—into a first mode and into a second mode, respectively, in response to corresponding inputs on the payment card and in preparation for an upcoming transaction. Thus, when a user retrieves the payment card, such as from a wallet, and enters an input sequence into the payment card in preparation for a transaction, Blocks S110 and S120 can handle different types or sequences of inputs onto the payment card to transition the payment card into a requested use mode.

In one implementation, a processor within the payment card executes Block S110 to transition the payment card into the first mode in response to detecting a single input on a surface of the payment card, and the processor executes Block S110 to transition the payment card into the second mode in response to detecting a pair of inputs on a surface of the payment card, such as two inputs onto the payment card within a preset period of time (e.g., 1200 milliseconds). For example, as described in U.S. patent application Ser. No. 13/904,939, the payment card can include a piezoelectric transducer electrically coupled to a 'wake' interrupt-enabled input pin of the processor such that, when a user taps on or bends the payment card with sufficient impact, the piezoelectric transducer outputs an electrical signal to the interrupt pin of the processor, which wakes the processor out of the off mode. Thus, the payment card can enter the first mode in Block S110 if the user taps on the card once, thereby communicating a single electrical pulse to the interrupt-enabled pin of the processor; and the payment card can enter the second mode in Block S120 if the user taps on the card twice within the preset period of time. For example, the processor can transition the payment card from an off state, hibernate state, or lock mode into the first mode in Block S110 in response to receipt of a single impulse (e.g., the first input sequence) onto the payment card, and the processor can transition the payment card from the first mode (or from the hibernate state, etc.) into the second mode in Block S120 in response to receipt of a two successive impulses (e.g., a double tap, the second input sequence) onto the payment card.

In another implementation, the processor transitions the payment card into the first mode in Block S110 in response to selection of a first input region on the payment card or in response to entry of a first sequence of inputs onto one or more regions of the card, and the processor transitions the payment card into the second mode in Block S120 in response to selection of a second input region on the payment card or in response to entry of a second sequence of inputs onto one or more regions of the card. For example, in this implementation, the payment card can include one or more capacitive touch sensors or electromechanical (e.g., dome) switches defining input regions across a surface of the payment card, and the processor can poll the one or more sensors to detect inputs on the inputs region; the processor can then transition into the first mode or into the second mode according to a sequence of inputs detected.

Yet alternatively, the processor can poll an accelerometer within the card and then enter the first mode in Block S110 in response to receipt of an acceleration (or a voltage output from the accelerometer) that exceeds a threshold magnitude. In this implementation, the processor can further interface with the accelerometer to detect a set or pair of impacts on the payment card within the preset period of time and both exceeding the threshold magnitude, and the processor can then enter the second mode in Block S120 accordingly.

However, the payment card can execute Blocks S110 and S120 to handle any other type or sequence of inputs into the card and to transition the payment card into the first mode and the second mode accordingly.

1.4 First Mode

Generally, in the first mode, the payment card withholds transmission of notification triggers to the mobile computing device for prompting presentation of payment-related data to the user (e.g., between activation of the payment card and use of the payment card in a subsequent transaction), whereas in the second mode, the payment card shares payment-related data from the payment card back to the mobile computing device for presentation to the user. In particular, the payment card can function as a single user-facing device for initiating a transaction with an external card reader in the first mode, and the payment card can cooperate with the associated mobile computing device to facilitate a transaction with an external card reader in the second mode, as in the first and second example applications described above.

1.5 Authentication

Figure 4:
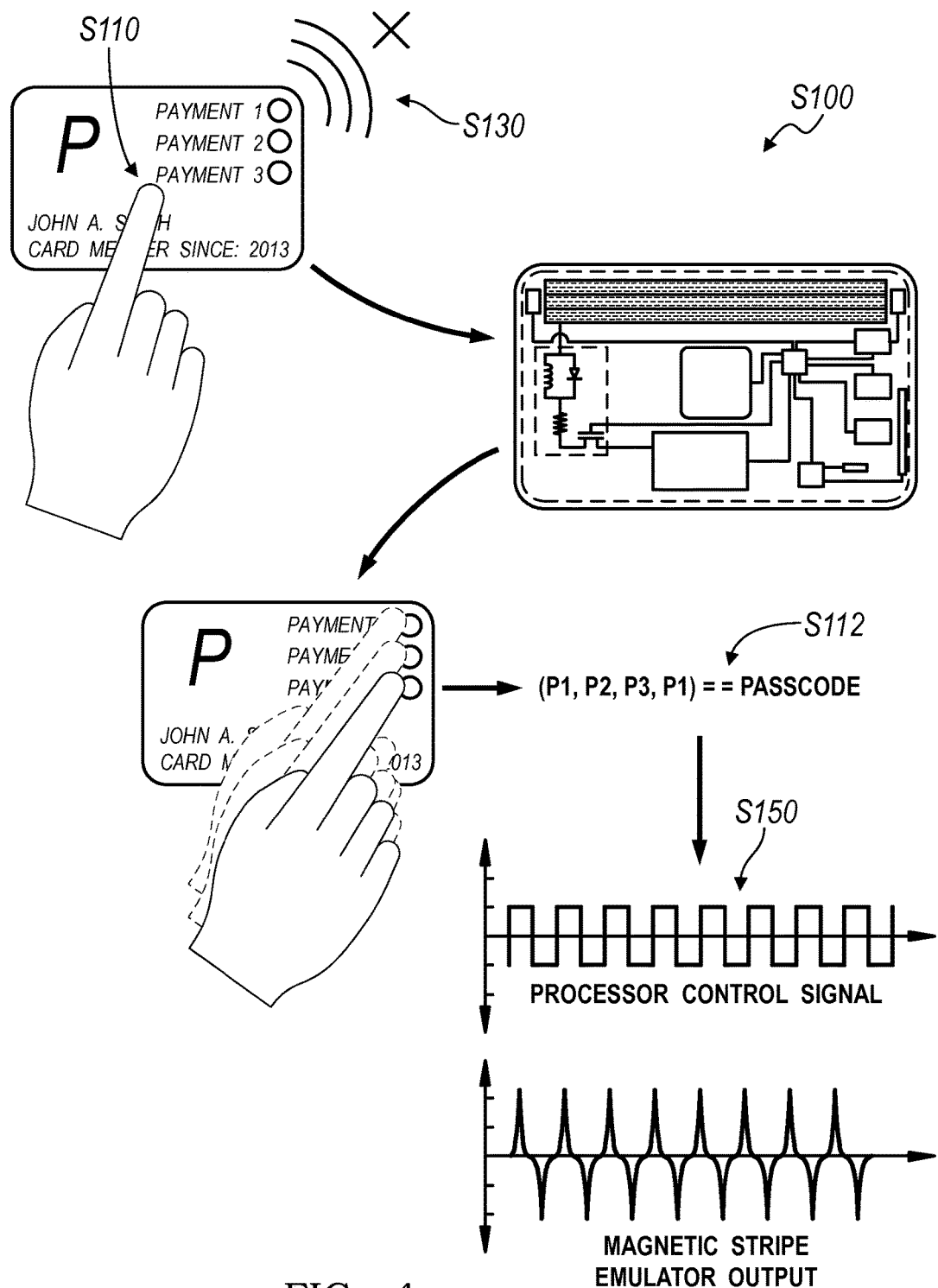
FIG. 4 is a flowchart representation in accordance with one variation of the first method.

As shown in FIGS. 1 and 4, one variation of the first method S100 includes Block S112, which recites, in response to entering the first mode, authenticating a future transaction with the magnetic stripe sequence command. Generally, Block S112 functions to authenticate use of the payment card for a subsequent transaction once the payment card enters the first mode.

In one implementation and as described in U.S. patent application Ser. No. 13/904,939, the processor executes Block S112 by attempting—through the wireless communication module—to establish a wireless connection with a computing device affiliated with the payment card. For example, a unique wireless address corresponding to a mobile computing device (e.g., a smartphone) associated with the payment card can be stored in memory on the payment card, such as in local memory on the wireless communication module. In this example, in response to transition from an off state into the first mode, the processor can trigger the wireless communication module to attempt to pair wirelessly (e.g., over Bluetooth) with a local mobile computing device assigned the unique wireless address. If a mobile computing device assigned the unique wireless address is found and a wireless connection with the mobile computing device successfully established, the processor can authorize use of the payment card in a subsequent transaction. The processor can then execute Block S114, as described below, to arm a controller within the payment card to drive the magnetic stripe emulator according to a default magnetic stripe sequence command in response to authorization of use of the payment card. Alternatively, the processor can then execute Block S116, as described below, to receive a manual selection for a particular payment method (or other magnetic stripe card) for emulation in the upcoming transaction, and the processor can thus arm a controller within the payment card to drive the magnetic stripe emulator according to a corresponding magnetic stripe sequence command.

In a similar implementation, the payment card is operable in a sleep mode when not in use and occasionally transitions into a test mode to check-in with the associated mobile computing device to maintain authorization of use of the payment card based on a result of attempted wireless communication with the mobile computing device. For example, the payment card can transition from the sleep mode into the test mode once per five-second interval (or at any other frequency or interval); once in the test mode, the wireless communication module within the payment card can broadcast an inquiry for the unique wireless address of the computing device affiliated with the payment card. In this example, if a token or other wireless communication is received from the mobile computing device in response to transmission of the inquiry (e.g., within 500 milliseconds of transmitting the inquiry), the payment card can preserve authorization of use of the payment card and transition back into the sleep mode. However, in this example, if a communication is not received from the mobile computing device within a threshold period of time (e.g., 500 milliseconds) of transmitting the inquiry, the payment card can transition into a locked state (or reattempt wireless communication with the mobile computing device by transmitting a second inquiry before transitioning into the locked state) in which emulation of a payment method by the payment card in a subsequent transaction is disabled until a passcode is entered into and authenticated at the payment card or until a wireless connection is again established with the mobile computing device. Therefore, in this implementation, the payment card can preserve (i.e., maintain) authentication of the payment card until a scheduled check-in with the affiliated mobile computing device fails to yield a viable wireless connection. Alternatively, the payment card can execute Block S112 to establish a (constant) wireless connection with the mobile computing device, to authenticate use of the payment card in a subsequent transaction while the wireless connection persists, and to de-authenticate use of the payment card (e.g., disable emulation of a payment method) when the wireless connection fails or is lost.

Thus, in the foregoing implementations, if the payment card succeeds in establishing a wireless connection with a particular (e.g., paired) mobile computing device, the processor can confirm that the payment card is sufficiently near (e.g., within a threshold authentication range of) the mobile computing device, which may indicate that an owner of the mobile computing device—who is also an owner of the payment card—is within a suitable proximity to the payment card. The processor can thus execute Block S112 to authenticate use of the payment card in a subsequent transaction accordingly.

However, in this implementation, if the wireless communication module fails to establish a wireless connection with the particular mobile computing device, the processor can prompt the user to enter a passcode as a backup authentication method in Block S112. For example, the processor can trigger a visual indicator (e.g., an LED lamp) within the payment card to signal to the user failure to authenticate use of the payment card (e.g., by flashing the LED lamp) though wireless communication with the affiliated mobile computing device and to thus prompt the user to enter a passcode into the payment card to manually authenticate use of the payment card. In this implementation, the processor can sample (e.g., poll) one or more input regions on the payment card to detect a sequence of inputs onto the payment card, and the processor can authenticate use of the payment card if the sequence of inputs matches a passcode stored on the payment card, such as described in U.S. patent application Ser. No. 13/904,939. However, the payment card can implement Block S112 in any other way to authenticate use of the payment card in a subsequent transaction, such as automatically based on proximity of the payment card to a paired mobile computing device or based on a passcode entered manually into the payment card, in response to entry of the payment card into the first mode. Alternatively, the processor can execute Block S112 in conjunction with Block S110 to transition into the first mode in response to receiving an authenticated passcode sequence onto a surface of the payment card.

1.6 Magnetic Stripe Card Selection

As shown in FIGS. 1 and 5, one variation of the first method S100 includes Block S114, which recites, in response to entering the first mode, assigning a particular payment method selected for a preceding transaction to a default payment slot on the payment card. Generally, Block S114 functions to set a payment method used in a (immediately-) preceding transaction as a default payment method for the upcoming transaction. For example, the processor within the payment card can execute Block S110 by interfacing with a piezoelectric transducer to detect a tap input on a surface of the payment card and can thus transition the payment card into the first mode accordingly; the processor can then execute Block S112 to authenticate use of the payment card and automatically execute Block S114 to automatically select a particular magnetic stripe sequence command—corresponding to a particular magnetic stripe card last used at the payment card—for the upcoming transaction. The payment card can thus implement Block S114 to set or select a default payment method for an upcoming transaction with the payment card based on a transaction history with the payment card, such as in response to authenticating use of the payment card in Block S112.

As shown in FIG. 1, another variation of the first method S100 includes Block S116, which recites, in the first mode, at the payment card, receiving a selection for a particular payment method from a set of payment methods stored on the payment card and arming the payment card to drive the magnetic stripe emulator according to a magnetic stripe sequence command corresponding to the particular payment method in response to the selection. Generally, Block S116 functions to receive a selection for a payment method (or other magnetic stripe card) corresponding to a magnetic stripe sequence command stored on the payment card and to set the payment card to emulate the payment method based on the corresponding magnetic stripe sequence command when the payment card is swept passed a card reader. For example and as described in U.S. patent application Ser. No. 13/904,939, in response to authenticating use of the payment card in Block S112, the processor can execute Block S116 by polling one or more input regions on the payment card for an input, correlating the input with a selection for a particular payment slot of the payment card, and arming the magnetic stripe emulator to implement a particular magnetic stripe sequence command corresponding to a magnetic stripe card assigned to the particular payment slot.

Alternatively, once a wireless connection is established between the payment card and a paired mobile computing device, the payment card can execute Block S116 by receiving a payment method selection from the mobile computing device over the wireless connection (and a corresponding magnetic stripe sequence command when applicable) and preparing to drive the magnetic stripe emulator accordingly when the payment card is swept through a card reader. For example, multiple magnetic stripe sequence commands corresponding to various magnetic stripe cards (e.g., credit cards, gift cards, personal identification cards, door access cards, etc.) can be stored in memory on the mobile computing device and accessed through a native payment card application executing on the mobile computing device. The native payment card application can support an interface accessible by a user through the mobile computing device: to select magnetic stripe sequence commands—from the set of magnetic stripe sequence commands stored on the mobile computing device—to upload to particular payment slots of the payment card for subsequent manual selection at the payment card for the upcoming transaction; to select a particular magnetic stripe sequence command—from the set of magnetic stripe sequence commands stored on the mobile computing device—to upload to a default or primary payment slot on the payment card; and/or to select a particular magnetic stripe sequence command—stored on the payment card—for emulation by the payment card during one or more subsequent transactions. Alternatively, once a wireless connection is established between the mobile computing device and the payment card, the native payment card application can automatically select a particular magnetic stripe card to emulate in the subsequent transaction—such as based on the location of the mobile computing device, as described below—and can automatically push the corresponding magnetic stripe sequence command to the payment card.

However, the payment card can implement Block S116 locally or in cooperation with a paired mobile computing device to receive and handle a manual (or automatic) selection for a particular magnetic stripe card—for emulation in subsequent transactions—in any other suitable way.

1.7 Second Mode

Block S130 of the first method S100 recites, in the second mode, attempting to establish a wireless connection with a mobile computing device associated with the payment card in Block S130. Generally, Block S130 functions to establish a wireless connection with a mobile computing device associated with the payment card. For example, the processor can receive a double-tap input on the surface of the payment card and enter the second mode accordingly in Block S120, and the wireless communication module within the payment card can automatically attempt to pair with a mobile computing device associated with a unique wireless address stored on the payment card, such as described in U.S. patent application Ser. No. 13/904,939, in Block S130.

Block S140 of the first method S100 recites, in response to establishing the wireless connection with the computing device, transmitting to the computing device a trigger for a notification and an identifier of a magnetic stripe card corresponding to a magnetic stripe sequence command stored on the payment card. Generally, once Block S130 establishes a wireless connection with the associated mobile computing device, Block S140 transmits payment-related data stored on the payment card back to the mobile computing device for (visual) presentation to the user.

In one implementation, the payment card executes Block S140 by transmitting a trigger and content for one notification to the mobile computing device, the content for the notification including an identifier (e.g., the last four digits of a card number) of a magnetic stripe card (e.g., a credit card) number automatically or manually selected a primary payment slot on the payment card. The mobile computing device can then execute Blocks of the second method described below to render the last four digits of the payment method (received from the payment card or retrieved locally based on the received identifier) within a notification on a display of the mobile computing device. As in the first example application, the payment card can transmit a trigger for a notification and an identifier of a credit card emulated in a most-recent transaction with the payment card in Block S140, the mobile computing device can render a notification showing the last four digits of the credit card (as retrieved from memory on the mobile computing device based on the received identifier), the user may provide the last four digits of the credit card to a sales clerk by presenting his mobile computing device—with the notification present—to the clerk. Thus, as in this first examples application, when the payment card enters the second mode in Block S120 and connects wirelessly with the mobile computing device in Block S130, the payment card can share information related to a payment method—recently emulated by the payment card—directly with the mobile computing device in Block S140, and the mobile computing device can substantially immediately display related information through a notification, such as rendered within a locked screen or within a home screen of the mobile computing device and without necessitating additional user input to access this information.

Alternatively, in the second example application, the payment card can transmit a first trigger for a first notification and a first identifier (e.g., a stored code name, the last four digits of a card number, a pseudorandomly-generated alphanumeric key, etc.) of a first payment method selected for emulation in an upcoming transaction with the payment card, a second trigger for a second notification and a second identifier of a second payment method corresponding to a second magnetic stripe command stored on the payment card, and a third trigger for a third notification and a third identifier of a third payment method corresponding to a third magnetic stripe command stored on the payment card in Block S140; the mobile computing device can then render a first notification including a nickname of the first payment method, a second notification including a nickname of the second payment method, and a third notification including a nickname of the third payment method, and the user may select one of the notifications rendered on the display of the mobile computing device. The mobile computing device can then push confirmation of the first payment for the upcoming transaction to the payment card in response to selection of the first notification, push an instruction to emulate the second payment method—rather than the first payment method—in response to selection of the second notification, or push an instruction to emulate the third payment method—rather than the first payment method—in response to selection of the third notification.

Thus, as in this second example application, when the payment card enters the second mode in Block S120 and connects wirelessly with the mobile computing device in Block S130, the payment card can share information related to a payment method—currently armed on the payment card—directly with the mobile computing device in Block S140, and the mobile computing device can substantially immediately display this information through one or more notifications, such as rendered within a locked screen or within a home screen of the mobile computing device and without necessitating additional user input to access this information. Furthermore, the mobile computing device can execute the second method described below to automatically render one or more notifications containing payment method-related information in response to activation of the payment card (e.g., once the payment card is transitioned from a hibernate mode into the first mode and/or into the second mode), and the user can thus arm the payment card with a particular payment method in preparation for an upcoming (physical, in-person) transaction with the payment card substantially in real-time by selecting a particular notification—corresponding to the particular payment method—at the mobile computing device.

In a third example application, the payment card enters the first mode Block S110 in response to a first input sequence (e.g., a single tap) on the payment card and receives a manual selection for a particular payment method for a subsequent transaction in Block S116. The payment card then enters into the second mode in Block S120 in response to a second input sequence (e.g., two taps) on the payment card and receives a preferred or "best" payment method for a subsequent transaction from the mobile computing device (e.g., a gift card or rewards credit card for a vendor currently occupied by the mobile computing device, a debit card for a bank currently occupied by the mobile computing device, a payment method previously used at or near the current location of the mobile computing device, etc.), as described below, in the second mode.

Alternatively, as in the foregoing implementations and example applications, the payment card can execute Block S140 to transmit a prompt to the mobile computing device to deliver a notification, the prompt excluding content related to payment methods or other magnetic stripe card data stored on the payment card. For example, in response to a double-tap input on a surface of the payment card, the payment card can enter the second mode in Block S120 and transmit a state marker—indicating that the payment card is now in the second mode—to the mobile computing device. In response to receipt of the state marker from the payment card, the mobile computing device (or the native payment card application executing on the mobile computing device) can retrieve a history of payment methods and/or other magnetic stripe sequence commands transmitted from the mobile computing device to the payment card and assigned to payment slots on the payment card. The mobile computing device can then generate one or more notifications for payment methods stored on the payment card based on a payment method data stored locally on the mobile computing device (or remotely in a remote database affiliated with the payment card) and in response to receipt of a state marker or other prompt from the payment card (the prompt excluding explicit data pertaining to payment methods loaded onto the payment card).

However, the payment card can execute Blocks S120, S130, and S140 in any other way to share payment method-related data stored on the payment card with the associated mobile computing device for presentation to the user, for selection by the user, and/or for modification by the user remotely through the mobile computing device substantially in real-time and without additional inputs into the mobile computing device to access these data and/or controls, as described below.

1.8 Transaction

As shown in FIG. 4, Block S150 of the first method S100 recites driving the magnetic stripe emulator according to a magnetic stripe sequence for a payment method in a selected payment slot in response to detection of a magnetic read head adjacent the payment card. Generally, Block S150 functions to mimic functionality of the payment method (e.g., a credit card, a debit card, a gift card) selected for the transaction by driving the magnetic stripe emulator according to a magnetic sequence corresponding to the selected payment method when the payment card is swept passed a card reader (e.g., a magnetic read head), such as described in U.S. patent application Ser. No. 13/904,939. In one implementation, once a transaction with the payment card is authorized in Block S112 (in the first mode or in the second mode), the processor polls a magnetic read head sensor arranged within the payment card (e.g., at a sampling rate of 20 Hz) and then triggers the controller to drive the magnetic stripe emulator according to a magnetic stripe sequence command corresponding to the particular payment method in response to an output of the magnetic read head sensor indicating proximity of a magnetic read head adjacent the payment card. However, the payment card can implement Block S150 in any other way to emulate one or more elected magnetic stripe cards in the first mode and in the second mode.

2. Second Method: Computing Device

As shown in FIG. 5, a second method S200 for remotely controlling a payment card in real-time through a computing device includes: at the computing device, establishing a wireless connection with a payment device in Block S210; over the wireless connection, receiving a trigger to render a notification related to the payment device in Block S220; identifying a first payment method corresponding to a first payment data file stored on the payment device in Block S220; rendering a first notification on a display of the computing device, the first notification indicating the first payment method in Block S222; and, in response to receiving a selection for the first notification rendered on the display of the computing device, transmitting an instruction to the payment device, over the wireless connection, to emulate the first payment method according to the first payment data file during an upcoming transaction in Block S250.

As shown in FIG. 6, one variation of the second method S200 includes: at the computing device, establishing a wireless connection with a payment card in Block S210; over the wireless connection, receiving a first identifier of a first magnetic stripe card corresponding to a first magnetic stripe sequence command stored on the payment card in Block S220; in response to receiving the first identifier of the first magnetic stripe card, rendering a first notification on a display of the computing device in Block S222, the notification indicating the first magnetic stripe card; identifying a second magnetic stripe card for an impending transaction with the payment card in Block S240, the second magnetic stripe card corresponding to a second magnetic stripe sequence command stored on the computing device; rendering a second notification on the display adjacent the first notification, the second notification indicating the second magnetic stripe card in Block S242; and in response to receiving a selection for the second notification rendered on the display of the computing device, transmitting an instruction to the payment card to emulate the second magnetic stripe card, rather than the first magnetic stripe card, according to the second magnetic stripe sequence command during an impending transaction with the payment card in Block S250.

Generally, the second method can be implemented by a computing device—such as a smartphone or a tablet—in conjunction with a payment card executing the first method S100 described above to present information related to magnetic stripe data stored on the payment card and to enable remote control of the payment card at the computing device. In particular, Blocks of the second method S200 can be handled by or implemented within a native payment card application executing on the computing device, the native payment card application generating and queuing notifications on the computing device in response to notification triggers and/or notification content received from the payment card, as described above.

Furthermore, the second method S200 is executable by a mobile computing device or other computing device to visually, haptically, and/or audibly present information related to payment methods (e.g., credit cards), identification methods (e.g., employee badges), and/or access methods (e.g., door access cards) emulatable by the payment card to a user in response to a limited number of inputs entered by the user into the payment card and/or into the computing device. The second method S200 can further automatically provide access to controls for the payment card though the computing device in response to a limited number of inputs entered by the user into the payment card and/or into the computing device. The second method S200 is described below as a method for controlling and interfacing with a reprogrammable payment card configured to emulate static magnetic stripes of magnetic stripe cards, such as magnetic stripe credit cards, magnetic stripe debit cards, magnetic stripe gift cards, and magnetic stripe door access cards. However, the second method S200 can be implemented as a method for controlling and interfacing with a reprogrammable payment card additionally or alternatively configured to emulate other types of transactional systems, such as integrated circuit cards (or "chip" cards, "smart" cards), bar code cards, Wiegand wire embedded cards, RFID proximity cards, and/or tokenized (e.g., dynamic) payment credentials, etc. for payment methods, access methods, and/or identification methods in addition to or in place of emulation of static magnetic stripe cards. Furthermore, the second method S200 can be executed by a computing device as a method for interfacing with and/or controlling other payment-, identification-, and/or access-related devices. For example, a smartphone can execute the second method S200 to interface with and control an NFC-enabled hard case arranged over a portion of the smartphone. However, the second method S200 can be implemented in conjunction with any other suitable type of device configured to emulate any other suitable type of payment method, access method, or identification method.

2.1 Example Applications

In a first example application described above, a computing device affiliated with the payment card, such as a computing device owned and/or operated by the same user carrying the payment card, executes the second method S200 by interfacing with the payment card over wireless communication protocol, by receiving a notification prompt (e.g., trigger) and notification content from the payment card once the payment card is transitioned into the second mode (e.g., by a double-tap input on the payment card) after completion of an emulation cycle in a transaction, and by rendering on its display a notification containing data (e.g., the last four digits of a card number) corresponding to a magnetic stripe card emulated by the payment card during the transaction.

In the second example application described above, the computing device executes the second method S200 by receiving a notification prompt (and notification content) from the payment card over wireless communication protocol when the payment card is activated (and authenticated) for use in a subsequent transaction, rendering one or more notifications indicating one or more magnetic stripe cards corresponding to magnetic stripe sequence commands stored on the payment card, and pushing an instruction to the payment card to emulate a particular magnetic stripe card in the subsequent transactions based on selection of a particular notification—corresponding to the particular magnetic stripe—at the computing device. In this second example application, the computing device (or the native payment card application executing on the computing device) can also render a notification for one or more alternative payment methods suitable for the upcoming transaction and can push both a magnetic stripe sequence command—for an alternative payment method not currently loaded onto the card—and an instruction to execute the magnetic stripe sequence command to the payment card in response to selection of a notification corresponding to the alternative payment method at the computing device.

Figure 7:
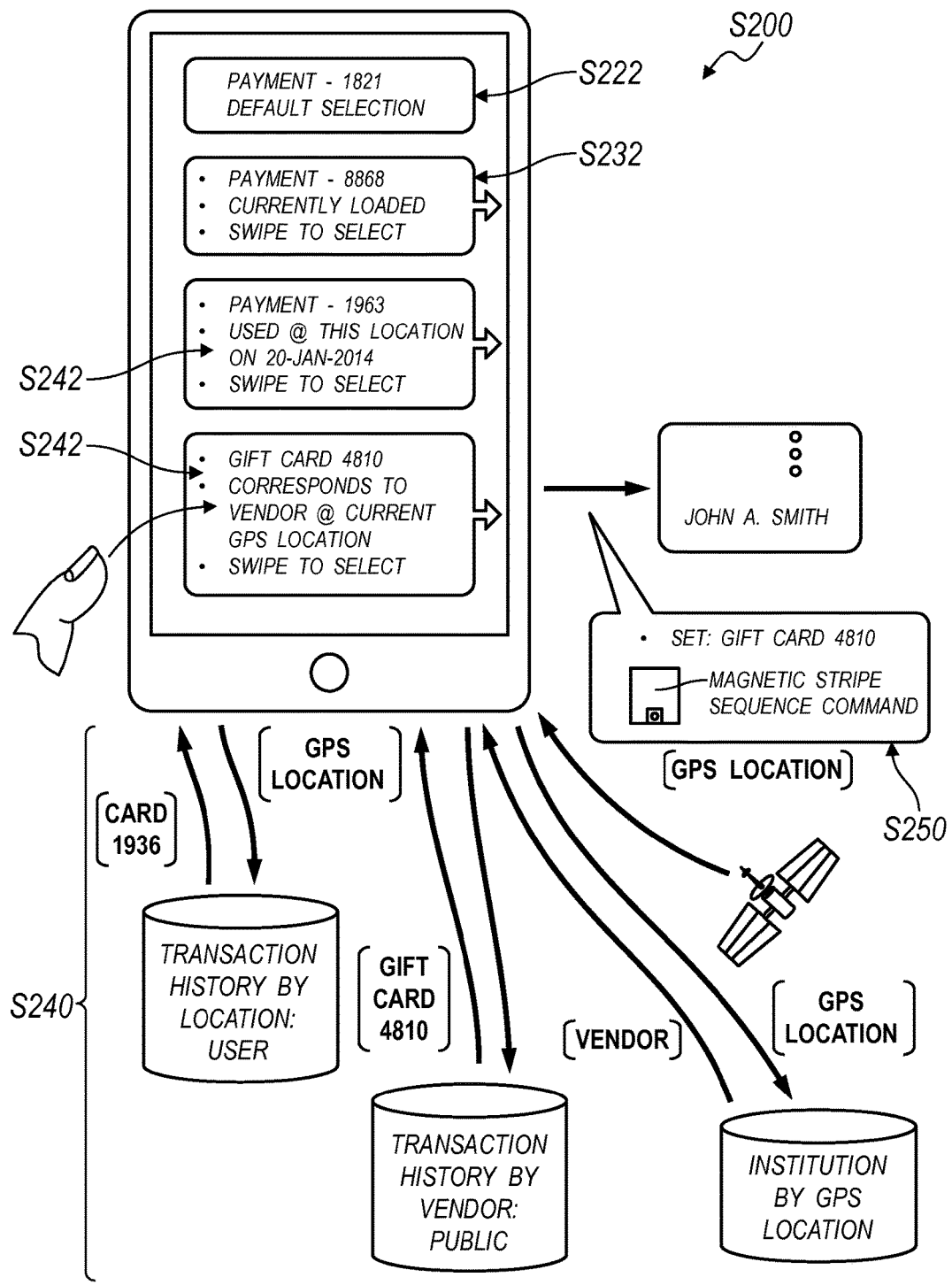
FIG. 7 is a flowchart representation in accordance with variations of the second method.

Thus as in the second example application, the computing device (or the native payment card application) can execute the second method S200 to identify payment methods possibly relevant to the upcoming transaction and can enable the user to quickly elect such an alternative payment method from a locked screen or from a home screen of the computing device and without necessitating further action by the user to open a native payment card application for access to such payment card controls. For example, the computing device can retrieve a current geospatial location of the computing device from a global positioning system (GPS) sensor arranged within the computing device, reference the current geospatial location against a local or remote database of institutions (e.g., companies, schools, hospitals, organization, retailers, wholesalers, grocers, residential buildings, etc.) to identify a particular institution substantially relevant the computing device's—and therefore the user's—current location, as shown in FIGS. 6 and 7. In this example, the computing device can execute Blocks of the second method S200 to select a door key if the current GPS location of the computing device corresponds to a hotel or other lodging establishment, to select a rewards credit card affiliated with a particular retail business if the current GPS location indicates that the computing device is occupying the particular retail business, to select a debit card affiliated with a particular bank if the current GPS location indicates that the computing device is occupying a banking location of the particular bank, and/or to select a student identification card affiliated with a particular university if the current GPS location indicates that the computing device is occupying a campus of the particular university.

However, the computing device or a native payment card application executing on a computing device can perform Blocks of the second method S200 in any other suitable application. The computing device or the native payment card application can also execute methods and techniques of both the first example application and the second example application described above at different times during the same transaction performed with the payment card.

2.2 Wireless Connection

Block S210 of the second method S200 recites, at the computing device, establishing a wireless connection with a payment card. Generally, Block S210 functions to establish a wireless connection with an affiliated payment card, such as over Bluetooth, Wi-Fi, or other short-range wireless communication protocol. In one implementation, the native payment card application can set the computing device in a wireless discoverable mode in Block S110, the payment card can broadcast a wireless inquiry for the affiliated computing device (e.g., an inquiry for a unique 48-bit address assigned to the computing device) in response to entering the first mode (or the second mode) after an input on its surface, and the native payment card application can handle receipt of the wireless inquiry by triggering the computing device to wirelessly pair with the payment card. In another implementation, the native payment card application triggers a wireless communication module within the computing device to cyclically broadcast a wireless inquiry for wirelessly pairing with a payment card linked to the native payment card application, such as by broadcasting at a rate of 0.5 Hz (i.e., once every two seconds) an inquiry for a unique 48-bit address assigned to the affiliated payment card. In this implementation, the payment card can then confirm or authorize wireless communication with the computing device in response to receipt of the inquiry from the computing device and establish a wireless connection therewith accordingly. However, the native payment card application, the computing device, and/or the payment card can cooperate to establish a wireless connection between the computing device and the payment card in Block S210 in any other suitable way.

2.3 First Notification

Block S220 of the second method S200 recites, over the wireless connection, receiving a first identifier of a first magnetic stripe card corresponding to a first magnetic stripe sequence command stored on the payment card; and Block S222 of the second method S200 recites, in response to receiving the first identifier of the first magnetic stripe card, rendering a first notification on a display of the computing device, the first notification indicating the first magnetic stripe card. Generally, Block S220 functions to receive from the payment card identifying information corresponding to a magnetic stripe sequence command stored on the payment card, and Block S222 functions to automatically present a form of this identifying information (in a visual format) on a digital display of the computing device for review by the user.

As in the first example application described above, the computing device (or the native payment card application) can execute Block S220 to collect notification data wirelessly broadcast by the payment card following a transaction with the payment card. For example, in response to completion of an emulation cycle at the payment card, the payment card (e.g., the wireless communication module within the payment card) can automatically broadcast notification data including a magnetic stripe card identifier (e.g., a stored code name, the last four digits of a card number, a pseudo-randomly-generated alphanumeric key, etc.) to the computing device, and the computing device can collect these notification data in Block S220. In this example, the computing device can then execute Block S222 by cross-referencing the magnetic stripe card identifier against a local database of magnetic stripe card identifiers stored in memory on the computing device to identify the particular magnetic stripe used in the transaction from the notification data received from the payment card. The computing device (or the native payment card application) can alternatively interface with a remote database to retrieve magnetic strip card data based on notification information received from the payment card, such as by interfacing with a remote application server over an Internet connection to collect magnetic stripe card data from a user profile specific to the user and stored in a remote user database. In this example, the computing device can also decrypt the notification data received from the payment card in Block S220 to extract useful identification information from an encrypted data received from the payment card. The computing device (or the native payment card application) can then automatically generate a notification including information pertaining to the particular magnetic stripe card, such as a nickname of the particular magnetic stripe card, the last four digits of a card number of the particular magnetic stripe card, a transaction history of the particular magnetic stripe card (e.g., a last time the particular magnetic stripe card was used in a transaction with the payment card), etc., and the computing device can render the notification on a virtual locked screen or within a home screen of the computing device to enable the user to (visually) access data contained within the notification without navigation to the native payment card application (related to the payment card) executing on the computing device by the user. The computing device (or the native payment card application) can thus execute the second method S200 in cooperation with the payment card to automatically provide payment-related information to the user, such as for presentation to a sales clerk during checkout, without necessitating multiple inputs into the computing device or into the payment card steps by user to retrieve this information.

In another example of the first example application, in response to a second input sequence (e.g., a double-tap input) on a surface of the payment card following completion of an emulation cycle at the payment card, the payment card can automatically broadcast to the computing device notification data including the last four digits of a magnetic stripe card (e.g., a credit card, a debit card) emulated during the transaction, as described above, and the computing device can collect these notification data in Block S220. In this example, the computing device (or the native payment card application) can generate a notification directly from notification data received from the payment card, such as by decrypting a nickname and the last four digits of a magnetic stripe card from encrypted notification data received from the payment card, and the computing device can then automatically queue (i.e., prepare to render) or immediately render the notification on a digital display of the computing device for review by the user.

Alternatively, in the second example application described above, the payment card can transmit notification data to the computing device—as in the foregoing example application—in response to receipt of a second input sequence (e.g., a double-tap input) on a surface of the payment card prior to use of the payment card in a pending transaction. The computing device (or the native payment card application) can then receive these notification data in Block S220, generate a notification based on relevant information extracted from the notification data (as described above), and then render the notification on a display of the computing device in Block S222. The computing device (or the native payment card application) can thus execute Blocks S220 and S222 to collect data pertaining to a magnetic stripe sequence command (e.g., for a credit card or debit card) stored on the payment card and to visually render related data on a display of the computing device prior to a transaction with the payment card, thereby providing the user with substantially immediate visual access to payment card data—such as a magnetic stripe card set in a default payment slot on the payment card or selected manually by the user at the payment card—prior to use of the payment card in the upcoming transaction.

In one variation of the second method S200, Block S220 recites, over the wireless connection, receiving a trigger to render a notification related to the payment device and identifying a first payment method corresponding to a first payment data file stored on the payment device in Block S220. Generally, in this variation, the computing device (or the native payment card application) can execute Block S220 to receive a prompt from the payment card and to retrieve—from a resource other than the payment card—identification information for one or more payment methods currently stored on the payment card. For example, as in the foregoing implementations and example applications, the payment card transmit a state marker to the computing device in Block S120 in response to entering the second mode; the computing device can receive this state marker in Block S220, retrieve a history of payment methods previously uploaded to the payment card from memory on the computing device (or from a remote application server in communication with the computing device), and identify a particular payment method (likely to be) loaded onto the payment card based on history in Block S210. In this example, the computing device can access the payment method history specifying particular payment methods (and/or access methods, identification methods, etc.) last uploaded to the payment card from the computing device and corresponding payment slot assignments set for these particular payment methods, as applicable. The computing device can then execute Block S222 to generate and to present a notification identifying the particular payment method, as described above. In this example, the payment card can transmit a state marker to the computing device each time a state of the payment card changes, such as by transmitting a marker for each state entered by the payment card when the payment card transitions into the first mode, into the second, into a sleep state, and into a locked state; the computing device can thus limit retrieval of payment method history data and generation of related notifications to instances in which such information is pertinent to access by the user, such as (only) in response to receipt of a state marker indicating that the payment card entered the second mode. The computing device (or the native payment card application) can implement similar methods and techniques in Blocks S230 and S240, etc. described below to access a history of payment methods 2.4 Ranked Notifications One variation of the second method S200 further includes Block S230, which recites, over the wireless connection, receiving a second identifier of a second magnetic stripe card corresponding to a second magnetic stripe sequence command stored on the payment card. In this variation, the second method S200 can further include Block S232, which recites rendering a second notification on the display of the computing device adjacent the first notification, the second notification indicating the second magnetic stripe card. Generally, in this variation, the computing device (or the native payment card application) can execute Blocks S230 and S232 in conjunction with Blocks S220 and S222 in the second example application to present additional information—related to magnetic stripe sequence commands stored on the payment card—in the form of a second notification rendered on the display of the computing device, such as prior to use of the payment card in the upcoming (e.g., pending) transaction.

In one example, in the second example application, the payment card transmits a notification trigger for each magnetic stripe sequence command assigned to a payment slot on the payment card in response to receipt of the second input sequence prior to use of the payment card in transaction (e.g., in response to receipt of the second input sequence outside of a threshold period of time after a previous transaction with the payment card, such as more than two minutes after a previous transaction within the payment card). In this example, for the payment card that includes three payment slots, as described above, the payment card broadcasts three notification triggers, one identifier of each of the three magnetic stripe sequence commands assigned to the payment slots, and a payment slot number for each of the three magnetic stripe sequence commands, and the computing device (or the native payment card application) receives the notification triggers and related information in Blocks S220 and S230. The computing device then renders a first notification identifying a first magnetic stripe card assigned to the first payment slot of the payment card in Block S222, renders a second notification identifying a second magnetic stripe card assigned to the second payment slot of the payment card in Block S232, and renders a third notification identifying a third magnetic stripe card assigned to the third payment slot of the payment card in response to receipt of the notification triggers from the payment card. The computing device (or the native payment card application) can thus execute Blocks S222 and S232, etc. to render multiple distinct notifications on the display of the computing device—such as within a virtual locked screen, on a virtual home screen of the computing device, or over an other native application currently open and executing on the computing device—in response to receipt of one or more notification triggers from the payment card in Blocks S220 and S230, etc., thereby enabling the user to substantially immediately access at the computing device multiple magnetic stripe cards assigned to payment slots on the payment card by entering an input (e.g., the second input sequence, a double-tap input) onto the card.

In this variation, the second method S200 can further include Block S260, which recites: detecting a location of the computing device; retrieving a transaction history of magnetic stripe cards applied to previous transactions within a range of the location; determining a first applicability of the first magnetic stripe card to the impending transaction based on the transaction history; determining a second applicability of the second magnetic stripe card to the impending transaction based on the transaction history; and rendering the first notification above the second notification in response to the first applicability exceeding the second applicability. Generally, the computing device (or the native payment card application) can execute Block S260 to set an order for multiple notifications rendered on the computing device, such as in response to receipt of multiple notification triggers from the payment card in the second example application described above.

In one example implementation, the computing device (or the native payment card application) retrieves a GPS location from a GPS sensor arranged within the computing device, references the GPS location against a database institutions (e.g., companies, schools, hospitals, organization, retailers, wholesalers, grocers, residential buildings, etc.) to identify a particular institution currently occupied by the computing device, and ranks magnetic stripe sequence commands assigned to slots on the payment card based on relations between the corresponding magnetic stripe cards and the institution in Block S260; the computing device can then order notifications delivered through the computing device in Blocks S222 and S232, etc. based on ranks calculated or otherwise determined for each of the magnetic stripe cards. For example, for a credit card assigned to a first payment slot of the payment card, a debit card assigned to a second payment slot on the payment card, and a room key for a particular hotel assigned to a third payment slot on the payment card, the computing device can render a third notification corresponding to the room key first, render a first notification for the credit card below the third notification in Block S222, and render a second notification for the credit card below the first notification in Block S232 if the current location of the computing device corresponds to (i.e., coincides with) a known location of the particular hotel in response to receipt of a corresponding notification trigger from the payment card. In this example, the computing device can render the first, second, and third notifications in the foregoing order when the location of the computing device indicates that the computing device (and therefore the user and the payment card) is occupying a wing or floor of the hotel containing hotel rooms or a particular room of the hotel corresponding to the room key; the computing device can also reorder the notifications or re-queue the notifications with the first notification for the credit card shown first following by the second notification for the debit card and then the third notification for the room key when the computing device moves to an alternative location within the hotel corresponding to a front desk, a vending machine, a spa, a bar, or a restaurant inside the hotel where the credit card (or the debit card) may be more applicable to the user's location. The computing device (or the native payment card application) can therefore repeatedly sample (e.g., "ping") the GPS sensor within the computing device, such as at a rate of 1 Hz, while the payment card is in the second mode and continually update the order of or re-queue notifications for magnetic stripe commands stored on payment slots on the payment card based on changes in the location of the computing device.

In another implementation, the computing device can retrieve the user's history of magnetic stripe card use by location, determine a current location of the user (e.g., based on a GPS location of the computing device, a known location of a local cellular tower in communication with the computing device, or a known location of a Wi-Fi router within wireless range of the computing device), predict a relevance of one or more magnetic stripe sequence commands assigned to payment slots of the payment card to the user's current location, and render or re-order corresponding notifications on the computing device accordingly in Blocks S222, S232, and S260 accordingly. For example, for a first credit card assigned to a first payment slot of the payment card, a second credit card assigned to a second payment slot on the payment card, and a debit assigned to a third payment slot on the payment card, the computing device can render a third notification corresponding to the debit card first, render a first notification for the first credit card below the third notification in Block S222, and render a second notification for the second credit card below the first notification in Block S232 if the current location of the computing device corresponds to (i.e., coincides with) a known location of a banking location of a bank issuing the debit card or if the current location of the computing device corresponds to a known location of an ATM machine in response to receipt of a corresponding notification trigger from the payment card. In this example, when the user later enters the second input sequence on the payment card and the payment card transmits a notification trigger to the computing device accordingly, the computing device (or the native payment card application) can again sample the GPS sensor (or other location sensor) within the computing device to determine that the user's current location is a bakery frequented by the user; the computing device can then render the second notification for the second credit card following by the first notification for the first credit card and then the third notification for the debit card based on the user's payment history at the bakery that indicates a preference for use of the second credit card in transactions with the bakery.

In the foregoing implementation, the computing device (or the native payment card application) can similarly apply histories of use of similar magnetic stripe cards (e.g., magnetic stripe cards issued by the same entities) by other users to queue or re-order presentation of notifications for magnetic stripe cards on the computing device, as shown in FIG. 7. For example, the computing device can retrieve a model or transaction histories of other users of one or more demographics similar to that/those of the user, such as other users of the same gender, age group, education level, and/or occupation as the user, and then apply the model or transaction histories of the other users to the user's current location and the magnetic stripe cards corresponding to payment slots of the user's payment card to order or queue corresponding notifications rendered on the computing device in Blocks S222 and S232, etc. In this example, the computing device can retrieve a list of types of magnetic stripe cards (e.g., room keys, credit cards issued by a particular company, rewards cards affiliated with particular vendors, debit cards issued by particular banks, gift cards associated with particular vendors, etc.) applied to previous transactions proximal the location by a group of individuals (e.g., exhibiting similarities with the user); can correlate the first magnetic stripe sequence command stored on the payment card with a first payment type and determine a frequency of application of the first payment type to previous transactions by the group of individuals proximal the location; similarly correlate the second magnetic stripe sequence command stored on the payment card with a second payment type and determine a frequency of application of the second payment type to previous transactions by the group of individuals proximal the location; and rank the first and second magnetic sequence commands for the upcoming transaction with the payment card based on the corresponding frequencies of use of similar types of payment cards in transactions by other individuals at or near the user's current location. In particular, in this example, the computing device can render the second notification for the second magnetic stripe card above the first notification for the first magnetic stripe card in response to the second applicability exceeding the first applicability.

The computing device (or the native payment card application) can thus execute Blocks S220, S222, S230, S232, and/or S260 to rank notifications presented to the user based on applicability of corresponding magnetic sequences commands to an upcoming transaction, such as based on the location of the computing device, the user's transaction history at the location, and/or transaction histories of other users at the same location or similar locations. The user can thus review the ranking (e.g., order) of notifications rendered on the display of the computing device to identify a particular magnetic stripe sequence command—and the corresponding payment slot on the payment card—recommended for the upcoming transaction, as in the second example application. The computing device can similarly execute Blocks S220, S222, S230, S232, and/or S260 to generate a single notification with a ranked list of magnetic stripe sequence commands assigned to payment slots on the payment card and to render this single notification on a virtual locked screen, in a home screen, or over an other native application open and executing on the computing device in response to receipt of a notification trigger (and related notification content) from the payment card. The user can then apply information gathered from the notifications rendered on the computing device to select a particular magnetic stripe sequence command for application by the payment card in the upcoming transaction by entering an input on an input region of the payment card corresponding to the particular magnetic stripe sequence command. The user can alternatively select (e.g., tap, swipe) a particular notification rendered on the display (e.g., a touchscreen) of the computing device, and the computing device can execute Block S250 to push an instruction to the payment card to apply a magnetic stripe sequence command corresponding to the particular notification selected by the user, as described below.

2.5. Magnetic Stripe Card Recommendations

One variation of the second method S200 includes Block S240, which recites identifying a second magnetic stripe card for an impending transaction with the payment card, the second magnetic stripe card corresponding to a second magnetic stripe sequence command stored on the computing device. In this variation, the second method S200 can further include Block S242, which recites rendering a second notification on the display adjacent the first notification, the second notification indicating the second magnetic stripe card. Generally, in the second example application, the computing device (or the native payment card application) can execute Block S240 to identify another magnetic stripe card corresponding to a magnetic stripe sequence command—stored locally in memory on the computing device or in a remote database hosting a user account associated with the payment card—applicable to an upcoming transaction with the payment card but not currently loaded into a payment slot on the payment card. For example, in response to receipt of the second input sequence on the payment card in preparation for an upcoming transaction, the payment card can enter the second mode and transmit a notification trigger to the computing device; the computing device can receive the notification trigger in Block S220, determine the current location of the computing device, identify an institution currently occupied by or proximal the computing device based on the current location of the computing device, and cross-reference the institution against a list of magnetic stripe cards corresponding to magnetic stripe sequence commands stored in local memory on the mobile computing device (or in the remote database hosting the user account associated with the payment card) to identity a particular magnetic stripe card particularly relevant to a transaction with the institution. For example, the computing device can correlate the current location of the computing device with a particular vendor and then select a particular magnetic stripe card issued by the vendor, issued by another institution in cooperation with or on behalf of the vendor. The computing device can then generate a second (or other) notification for the particular magnetic stripe card—such as including a nickname, an identifier of an issuing company, or other suitable identifier—in Block S240 and render this notification on the display of the computing device in Block S242.

In one example implementation, the computing device (or the native payment card application): implements methods or techniques described above to correlate the current location of the computing device with a lodging establishment occupied by the computing device; identifies a magnetic stripe sequence command corresponding to a room key for the lodging establishment, stored in local memory on the computing device, and not currently loaded onto the payment card in Block S240; generates a second notification specifying the room key; and renders the second notification on the display alongside the first notification for a first magnetic sequence command (e.g., a credit card) currently loaded onto the payment card in Block S242. In this example implementation, the computing device can rank the room key over the first magnetic sequence command for application in an upcoming transaction with the payment card based on the current location of the computing device and render the first and second notifications accordingly (e.g., by rendering the second notification virtually over or ahead of the first notification on the digital display). Furthermore, in this example implementation, the computing device can: continue to sample the GPS or other location sensor within the computing device (e.g., at a rate of 0.5 Hz until the payment card transmits a notification to the computing device indicating that the payment card was used in a transaction) to detect a change in location of the computing device; repeat Block S240 to identify a third magnetic stripe card stored on the computing device, not currently loaded on the payment card, and (possibly) applicable to an upcoming (e.g., impending) transaction with the payment card based on a subsequent location of the computing device; and repeat Block S242 to render a third notification—indicating the third magnetic stripe card—on the display adjacent the first notification, as described above.

The computing device can further implement methods or techniques described above to apply transaction data of other individuals, such as of demographics similar to those of the user, at the user's current location to select a magnetic stripe sequence command stored on the computing device but not currently loaded on the payment card and to render a corresponding notification for review by the user through the computing device prior to the upcoming transaction, as shown in FIG. 7.

The computing device (or the native payment card application) can therefore execute S240 to identify an alternative magnetic stripe card currently activated within or available through the user's account (e.g., locally on the computing device or remote in a remote data of user profiles) and potentially relevant to an upcoming transaction in response to a notification trigger received from the payment card, and the computing device can further execute Block S242 substantially in real-time to present the notification in a visual (and/or tactile, haptic) form to the user through a display (or vibrator, alarm) integrated into the computing device.

2.6 Magnetic Stripe Card Selection

Block S250 of the second method S200 recites, in response to receiving a selection for the first notification rendered on the display of the computing device, transmitting an instruction to the payment card, over the wireless connection, to emulate the first magnetic stripe card according to the first magnetic stripe sequence command during an impending transaction. Generally, in response to receiving a selection from the user for a particular notification, the computing device (or the native payment card application) can execute Block S250 to automatically transmit a command to the payment card to emulate a particular magnetic stripe—corresponding to the particular notification—when the payment card is used in a subsequent transaction, such as when the payment card is swept through a magnetic card reader.

In one example, in the second example application described above, the computing device (or the native payment card application) can transmit an instruction specifying emulation of a first magnetic stripe sequence command in an upcoming transaction in response to selection of the first notification from a list of notifications rendered on the display of the computing device, such as a list of notifications including the first notification corresponding to the first magnetic stripe sequence command stored on the payment card, a second notification corresponding to a second magnetic stripe sequence command stored on the payment card, and a third notification corresponding to a third magnetic stripe sequence command recommended by the computing device in Block S240 and not currently stored on the payment card. In this example, the user can tap a particular notification, swipe (shown in FIG. 7) a particular notification (e.g., horizontally toward the right), drag a particular notification into a virtual action bucket, or select a particular notification in any other suitable way or according to any other suitable gesture, and the computing device can broadcast to the payment card an instruction to emulate a magnetic stripe card in response to receipt of such a selection for a corresponding notification. As described above, the payment card can then receive the instruction broadcast wirelessly from the computing device, arm a controller within the payment card according to the first magnetic stripe sequence command, and the drive the magnetic stripe emulator within the payment card according to the first magnetic stripe sequence command when a card reader is detected near the payment card (e.g., when the payment card detects motion through a magnetic stripe card reader).

In one variation of the second method S200, Block S250 similarly recites, in response to receiving a selection for the second notification rendered on the display of the computing device, transmitting an instruction to the payment card to emulate the second magnetic stripe card, rather than the first magnetic stripe card, according to the second magnetic stripe sequence command during an impending transaction with the payment card. Generally, the computing device (or the native payment card application) can execute Block S250, in this variation, to transmit to the payment card an instruction to emulate an alternative magnetic stripe card—such as a magnetic stripe card recommended according to the second method S200 in Blocks S240 and S242 but not currently loaded onto the payment card—and to upload a magnetic stripe sequence command corresponding to the alternative magnetic stripe card to the payment card over the wireless connection in response to selection of notification corresponding to the alternative magnetic stripe card, as shown in FIG. 7. The computing device (or the native payment card application) can therefore execute Block S250 to automatically load the payment card with a magnetic stripe sequence command based on a selection by the user at the computing device for a corresponding magnetic stripe card for emulation in an upcoming transaction. The payment card can thus download a magnetic stripe sequence command from the computing device, load the magnetic stripe sequence command into a particular payment slot on the payment card (e.g., a default payment slot, a temporary payment slot, or the third payment slot), set the particular payment slot for the upcoming transaction, and then drive the magnetic stripe emulator within the payment card according to the particular payment slot set for the upcoming transaction when an output of a magnetic read head sensor within the payment card indicates proximity of the payment card to a magnetic stripe card reader.

The computing device can additionally or alternatively open a native payment card application associated with the payment card in Block S250 in response to selection of a notification (e.g., the first notification, the second notification) from the virtual locked screen, from a home screen, or from over an other native application currently open and executing on the computing device. Therefore, the computing device can execute Block S250 to automatically open a virtual user interface of the native payment card application on the computing device in response to selection of a related notification rendered on a display of the computing device outside of the native payment card application, thereby automatically providing the user with immediate access to additional payment card-related controls within the native payment card application. For example, the computing device can execute Blocks of the second method S200 to automatically open the native payment card application on the computing device and to push an instruction for emulation of a particular magnetic stripe card to the payment card in response to as few inputs by the user as a double-tap input on a surface of the payment card and selection of a related notification on a touchscreen of computing device.

However, the computing device (or the native payment card application) can implement Block S250 in any other suitable way to handle selection of a particular magnetic stripe card through a notification on the computing device and to push an instruction and related magnetic stripe sequence data (when applicable) to the payment card.

2.7 Variations

In one variation, the payment card and the computing device (or the native payment card application) execute Blocks of the first method S100 and the second method S200, respectively, to perform a "card-not-present" transaction, that is a remote transaction, such as to provide payment for a product ordered over the Internet or to provide payment information for an in-application purchase made on the computing device. In one example of this variation, the payment card can transmit authorization (e.g., in the form of a prompt or notification, as described above) for use of a payment method associated with the payment card (e.g., stored on the payment card and/or hosted by the instance of the native payment card application executing on the affiliated computing device) in response to receipt of the second input sequence on a surface of the card. The computing device can then handle receipt of this authorization from the payment card by automatically populating payment fields in a virtual order form with relevant information from the selected payment method. In this example, the computing device can similarly handle receipt of authorization from the payment card by automatically generating a tokenized digital payment credential for the selected payment method and transmitting the tokenized digital payment credential to a third party to provide payment for the transaction.

In another example of the foregoing variation, the computing device can disable submission of payment information—stored on the computing device or hosted by the native payment card application—with a transaction performed at the computing device, such as through a native application or through a web browser executing on the computing device, until wireless communication between the computing device and the payment card is established. In this example, in response to initiating of a transaction through a native application or a web browser executing on the computing device, the computing device can render a first notification containing a prompt to "wake" the payment card to provide payment information for the transaction; the user can then tap (or double-tap, etc.) the payment card upon reviewing the notification to wake the payment card. The payment card can wake and then broadcast an inquiry for the computing device in response to receiving the tap input, and the computing device can confirm the transaction in response to receipt of the inquiry. In this example, the computing device can further rend one or more notifications on the display of the payment card, wherein each rendered notification indicates a payment method available for use in the transaction, as described above. The user can select a particular notification, as described above, to elect the corresponding payment method for the transaction, and the computing device can automatically populate payment fields in a virtual order form with relevant information from the selected payment method, as described above. Alternatively, the computing device can automatically generating a tokenized digital payment credential for the selected payment method in response to selection of the correspond notification, and the computing device can then transmit the tokenized digital payment credential to a third party to provide payment for the transaction. However, the payment card and the computing device (or the native payment card application) can execute Blocks of the first method S100 and the second method S200, respectively, to support or enable "card-not-present" transactions in any other suitable way.

The payment card can implement similar methods and techniques to emulate other types of transactional cards—such as integrated circuit cards (or "chip" cards, "smart" cards), bar code cards, Wiegand wire embedded cards, RFID proximity cards, and/or an other static or tokenized (e.g., dynamic) payment credentials—in addition to or in place of static magnetic stripe cards. For example, the payment card can include a magnetic stripe emulator, a NFC (near-field communication) wireless transmitter that broadcasts a dynamic encrypted payment signature, and a bar code emulator, and the payment card can execute Blocks of the first method S100 described above to enable or facilitate transactions with each of the magnetic stripe emulator, the NFC transmitter, and the bar code emulator. Furthermore, the computing device, the native payment card application, and/or a related application server, can execute Blocks of the second method S200 to enable controls for the payment card to support emulation of payment methods, security access methods, and/or identification methods. For example, the computing device (or the native payment card application) can implement similar method and techniques to render notifications for one or more other types of static transactional cards supported by the payment card, to recommend transactional cards of one or more other types to the user prior to a transaction, to transmit instructions to emulate particular transactional cards selected by the user at the computing device, and to push (e.g., upload) transactional card data to the payment card as needed in preparation for use of the payment card in upcoming transactions.

Furthermore, one or more Blocks of the second method S200 can be executed remotely from the computing device and the payment card, such as on a remote computer network or by an application server hosting the native payment card application affiliated within the payment card.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile computing device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for remotely controlling a payment device in real-time through a computing device, the method comprising:
   at the computing device, establishing a wireless connection with a payment device;
   over the wireless connection, receiving a trigger to render a notification related to the payment device;
   identifying a first payment method corresponding to a first payment data file stored on the payment device;
   presenting a first notification within a virtual locked screen rendered on a display of the computing device, the first notification indicating the first payment method; and
   in response to receiving a selection for the first notification rendered on the display of the computing device, transmitting an instruction to the payment device, over the wireless connection, to emulate the first payment method according to the first payment data file during an upcoming transaction.

2. The method of claim 1, further comprising:
   over the wireless connection, receiving a second identifier of a second payment method corresponding to a second payment data file stored on the payment device; and
   rendering a second notification on the display of the computing device adjacent the first notification, the second notification indicating the second payment method;
   wherein transmitting the instruction to the payment device comprises transmitting the instruction specifying application of the first payment method to the upcoming transaction in response to selection of the first notification from a list of notifications rendered on the display of the computing device, the list of notifications comprises the first notification and the second notification.

3. The method of claim 2, further comprising:
   detecting a location of the computing device;
   retrieving a transaction history of payment methods applied to previous transactions within a range of the location;
   determining a first applicability of the first payment method to the upcoming transaction based on the transaction history; and
   determining a second applicability of the second payment method to the upcoming transaction based on the transaction history;
   wherein rendering the first notification and rendering the second notification on the display of the computing device comprises rendering the first notification above the second notification in response to the first applicability exceeding the second applicability.

4. The method of claim 1, further comprising, at the computing device, opening a native application associated with the payment device in response to selection of the first notification from the virtual locked screen.

5. The method of claim 1, wherein rendering the first notification on the display of the computing device comprises rendering the first notification comprising the last four digits of a credit card number corresponding to the first payment method.

6. The method of claim 1, wherein identifying the first payment method corresponding to the first payment data file stored on the payment device comprises retrieving, from memory on the computing device, a history of payment methods previously uploaded to the payment card.

7. A method for remotely controlling a payment card in real-time through a computing device, the method comprising:
   at the computing device, establishing a wireless connection with a payment card;
   over the wireless connection, receiving a first identifier of a first magnetic stripe card corresponding to a first magnetic stripe sequence command stored on the payment card;
   in response to receiving the first identifier of the first magnetic stripe card, rendering a first notification on a display of the computing device, the first notification specifying a first nickname, stored in memory on the computing device, for the first magnetic stripe card;
   identifying a second magnetic stripe card for an upcoming transaction with the payment card, the second magnetic stripe card corresponding to a second magnetic stripe sequence command stored on the computing device;
   rendering a second notification on the display adjacent the first notification, the second notification specifying a second nickname, stored in memory on the computing device, for the second magnetic stripe card; and
   in response to receiving a selection for the second notification rendered on the display of the computing device, transmitting an instruction to the payment card to emulate the second magnetic stripe card, rather than the first magnetic stripe card, according to the second magnetic stripe sequence command during an upcoming transaction with the payment card.

8. The method of claim 7, further comprising detecting a location of the computing device and correlating the location with a vendor proximal the computing device; wherein identifying the second magnetic stripe card comprises identifying the second magnetic stripe card from a set of magnetic stripe cards corresponding to magnetic stripe sequence commands stored on the computing device, the second magnetic stripe card affiliated with the vendor.

9. The method of claim 8, wherein correlating the location with the vendor comprises correlating the location with a lodging establishment occupied by the computing device; wherein identifying the second magnetic stripe card comprises identifying the second magnetic stripe card comprising a room key for the lodging establishment, the room key corresponding to the second magnetic stripe sequence command stored on the computing device; and wherein transmitting the instruction to the payment card to emulate the second magnetic stripe card comprises transmitting to the payment card, over the wireless connection, the second magnetic stripe sequence command and the instruction to arm a controller within the payment card with the second magnetic stripe sequence command.

10. The method of claim 8, further comprising:
detecting a change in location of the computing device from the location to a second location;
identifying a third magnetic stripe card for an upcoming transaction with the payment card based on the second location, the third magnetic stripe card corresponding to a third magnetic stripe sequence command stored on the computing device; and
rendering a third notification on the display adjacent the first notification, the third notification indicating the third magnetic stripe card.

11. The method of claim 7, further comprising:
detecting a location of the computing device;
retrieving a transaction history of magnetic stripe cards applied to previous transactions within a range of the location;
determining a first applicability of the first magnetic stripe card to the upcoming transaction based on the transaction history; and
determining a second applicability of the second magnetic stripe card to the upcoming transaction based on the transaction history;
wherein rendering the first notification and rendering the second notification on the display of the computing device comprise rendering the second notification above the first notification in response to the second applicability exceeding the first applicability.

12. The method of claim 11, wherein retrieving the transaction history comprises retrieving a list of types of magnetic stripe cards affiliated with a group of individuals and applied to previous transactions proximal the location; wherein determining the first applicability of the first magnetic stripe card to the upcoming transaction comprises correlating the first magnetic stripe card with a first payment type and determining a frequency of application of the first payment type to previous transactions proximal the location; and wherein determining the second applicability of the second magnetic stripe card to the upcoming transaction comprises correlating the second magnetic stripe card with a second payment type and determining a frequency of application of the second payment type to previous transactions proximal the location.

13. A method for facilitating payment with a payment card comprising:
in response to receiving a first input sequence on a surface of the payment card, entering a first mode at the payment card;
in response to receiving a second input sequence on the surface of the payment card, entering a second mode at the payment card;
in the second mode, attempting to establish a wireless connection with a computing device associated with the payment card;
in response to establishing the wireless connection with the computing device, transmitting to the computing device a trigger for a notification and an identifier and a slot number for each magnetic stripe card in a set of magnetic stripe cards assigned to payment slots on the payment card, each magnetic stripe card in the set of magnetic stripe cards associated with a magnetic stripe sequence command stored on the payment card; and
in response to detecting a magnetic read head adjacent the payment card, driving a magnetic stripe emulator within the payment card according to a magnetic stripe sequence command stored on the payment card and corresponding to a magnetic stripe card.

14. The method of claim 13, wherein driving the magnetic stripe emulator according to a magnetic stripe sequence command comprises, in the first mode and during a transaction, driving the magnetic stripe emulator according to a first magnetic stripe sequence command stored on the payment card and corresponding to a first magnetic stripe card comprising a first credit card; wherein entering the second mode at the payment card comprises entering the second mode at the payment card at a time succeeding the transaction; and wherein transmitting an identifier of a magnetic stripe card to the computing device comprises transmitting an identifier of the first credit card corresponding to the first magnetic stripe sequence command emulated by the magnetic stripe emulator during the transaction.

15. The method of claim 14, wherein transmitting the trigger for the notification and an identifier of a magnetic stripe card comprises, in the second mode, transmitting to the computing device a trigger to render the last four digits of a credit card number of the first credit card on a display of the computing device.

16. The method of claim 13, wherein entering the first mode comprises entering the first mode in response to receipt of a single input on a surface of the payment card that deflects the payment card out of plane; and wherein entering the second mode comprises entering the second mode in response to receipt of two tap inputs on the surface of the payment card within a threshold period of time.

17. The method of claim 13, further comprising:
in the first mode, receiving a manual selection for a first magnetic stripe card, from a set of magnetic stripe cards, at the payment card, the set of magnetic stripe cards corresponding to magnetic stripe sequence commands stored on the payment card;
in the first mode, in response to receiving the manual selection for the first magnetic stripe card, arming a controller within the payment card to drive the magnetic stripe emulator according to a first magnetic stripe sequence command corresponding to the first magnetic stripe card; and
in the second mode, arming the controller to drive the magnetic stripe emulator according to a second magnetic stripe sequence command in response to receipt of the second magnetic stripe sequence command from the computing device, the second magnetic stripe sequence command corresponding to a second magnetic stripe card selected for an upcoming transaction by the computing device.

18. The method of claim 17, further comprising, in the second mode, downloading the second magnetic stripe sequence command from the computing device and replacing the first magnetic stripe sequence command with the second magnetic stripe sequence command in memory on the payment card.

19. The method of claim 13, further comprising:
in the first mode, arming a controller within the payment card to drive the magnetic stripe emulator according to a first magnetic stripe sequence command in response to receipt of the first input sequence on the surface of the payment card, the first magnetic stripe sequence command corresponding to a first magnetic stripe card selected for a preceding transaction with the payment card; and in the second mode, arming the controller to drive the magnetic stripe emulator according to a second magnetic stripe sequence command in response to receipt of the second magnetic stripe sequence command from the computing device, the second magnetic stripe sequence command corresponding to a second magnetic stripe card selected for an upcoming transaction by the computing device.

20. The method of claim 13, wherein entering the second mode at the payment card comprises transitioning from a hibernate mode into the second mode in response to the second input sequence comprising a tap on the surface of the payment card;

further comprising entering a lock mode at the payment card in response to receipt of a threshold number of failed attempts to establish a wireless connection with the computing device, the payment card suppressing a function of the magnetic stripe emulator in the lock mode; and wherein entering the first mode at the payment card comprises transitioning from the lock mode into the first mode in response to receiving the first input sequence comprising an authenticated passcode sequence on the surface of the payment card.

\* \* \* \* \*